United States Patent
Chun et al.

(10) Patent No.: US 9,578,532 B2
(45) Date of Patent: Feb. 21, 2017

(54) METHOD AND APPARATUS FOR MEASURING CHANNEL QUALITY INDICATOR IN WIRELESS COMMUNICATION SYSTEM

(71) Applicant: LG ELECTRONICS INC., Seoul (KR)

(72) Inventors: Jin Young Chun, Anyang-si (KR); Bin Chul Ihm, Anyang-si (KR); Ji Won Kang, Anyang-si (KR); Ki Tae Kim, Anyang-si (KR); Sung Ho Park, Anyang-si (KR); Su Nam Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 204 days.

(21) Appl. No.: 14/359,054

(22) PCT Filed: Nov. 23, 2012

(86) PCT No.: PCT/KR2012/009967
§ 371 (c)(1),
(2) Date: May 16, 2014

(87) PCT Pub. No.: WO2013/077661
PCT Pub. Date: May 30, 2013

(65) Prior Publication Data
US 2014/0301238 A1 Oct. 9, 2014

Related U.S. Application Data

(60) Provisional application No. 61/563,608, filed on Nov. 25, 2011, provisional application No. 61/577,074, filed on Dec. 18, 2011.

(51) Int. Cl.
*H04L 5/00* (2006.01)
*H04W 24/10* (2009.01)
(Continued)

(52) U.S. Cl.
CPC .......... *H04W 24/10* (2013.01); *H04B 7/0456* (2013.01); *H04B 7/0617* (2013.01);
(Continued)

(58) Field of Classification Search
None
See application file for complete search history.

(56) References Cited

U.S. PATENT DOCUMENTS 8,824,384 B2 * 9/2014 Nam ..................... H04L 1/0003
370/329
2011/0002290 A1 1/2011 Kim et al.
(Continued)

FOREIGN PATENT DOCUMENTS

WO 2011/087272 7/2011

OTHER PUBLICATIONS

CATT, "Discussion on CoMP Specification Impact," 3GPP TSG RAN WG1 Meeting #66, R1-112108, Aug. 2011, 4 pages.
(Continued)

*Primary Examiner* — Charles C Jiang
*Assistant Examiner* — Kyaw Z Soe
(74) *Attorney, Agent, or Firm* — Lee Hong Degerman Kang Waimey

(57) ABSTRACT

Provided are a method and an apparatus for measuring channel quality indicator in a wireless communication system. User equipment receives, from a base station, at least one of a cell-specific reference signal (CRS) which is cell-specifically transmitted and a channel state information reference signal (CSI RS). The user equipment also receives, from the base station, a demodulation reference signal (DMRS) which is user equipment-specifically transmitted in an enhanced physical downlink control channel (e-PDCCH) region constituted in a physical downlink shared channel
(Continued)

(PDSCH) region. The terminal measures the CQI based on either at least one of the CRS and the CSI RS or the DMRS.

13 Claims, 19 Drawing Sheets

(51) Int. Cl.
*H04B 7/04* (2006.01)
*H04B 7/06* (2006.01)

(52) U.S. Cl.
CPC ......... *H04B 7/0665* (2013.01); *H04L 5/0048* (2013.01); *H04L 5/0053* (2013.01); *H04L 5/005* (2013.01); *H04L 5/0044* (2013.01); *H04L 5/0057* (2013.01)

(56) References Cited

U.S. PATENT DOCUMENTS

| | | | |
|---|---|---|---|
| 2011/0141987 A1* | 6/2011 | Nam | H04L 1/0003 370/329 |
| 2011/0194551 A1* | 8/2011 | Lee | H04B 7/0626 370/342 |
| 2013/0044664 A1* | 2/2013 | Nory | H04L 1/0045 370/311 |
| 2013/0044727 A1* | 2/2013 | Nory | H04L 5/0092 370/330 |
| 2013/0107861 A1* | 5/2013 | Cheng | H04W 72/042 370/331 |
| 2013/0301548 A1* | 11/2013 | Etemad | H04W 76/048 370/329 |
| 2013/0308488 A1* | 11/2013 | Tong | H04B 7/0452 370/252 |
| 2014/0321306 A1* | 10/2014 | Nam | H04L 1/0003 370/252 |
| 2014/0321313 A1* | 10/2014 | Seo | H04J 11/00 370/252 |

OTHER PUBLICATIONS

CATT, "E-PDCCH multiplexing and link level evaluations," 3GPP TSG RAN WG1 Meeting #67, R1-113744, Nov. 2011, 5 pages.
Samsung, "DM-RS based Distributed and Localized E-PDCCH structure," 3GPP TSG RAN WG1 #67, R1-114239, Nov. 2011, 4 pages.
Korean Intellectual Property Office Application Serial No. 10-2014-7014075, Office Action dated Jul. 20, 2015, 4 pages.
Nokia Siemens Networks, et al., "CQI for R11 CoMP with CRS and CSI-RS based feedback," 3GPP TSG-RAN WG1 Meeting #67, R1-114318, Nov. 2011, 2 pages.
PCT International Application No. PCT/KR2012/009967, Written Opinion of the International Searching Authority dated Mar. 5, 2013, 1 page.

* cited by examiner

Antenna 0

Antenna 1

Antenna 2

Antenna 3

METHOD AND APPARATUS FOR MEASURING CHANNEL QUALITY INDICATOR IN WIRELESS COMMUNICATION SYSTEM

CROSS-REFERENCE TO RELATED APPLICATIONS

This application is the National Stage filing under 35 U.S.C. 371 of International Application No. PCT/KR2012/009967, filed on Nov. 23, 2012, which claims the benefit of U.S. Provisional Application Ser. No. 61/563,608, filed on Nov. 25, 2011, and 61/577,074, filed on Dec. 18, 2011, the contents of which are all hereby incorporated by reference herein in their entirety.

BACKGROUND OF THE INVENTION

Field of the Invention

The present invention relates to wireless communications, and more particularly, a method and apparatus for measuring a channel quality indicator in a wireless communication system.

Related Art

The next-generation multimedia wireless communication systems which are recently being actively researched are required to process and transmit various pieces of information, such as video and wireless data as well as the initial voice-centered services. The $4^{th}$ generation wireless communication systems which are now being developed subsequently to the $3^{rd}$ generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, inter-symbol interference (ISI), and the Doppler Effect resulting from the mobility of a user equipment. A variety of techniques are being developed in order to overcome the abnormal characteristics of the wireless channel and to increase the reliability of wireless communication.

Meanwhile, with the employment of machine-to-machine (M2M) communication and with the introduction and distribution of various devices such as a smart phone, a table personal computer (PC), etc., a data requirement size for a cellular network is increased rapidly. To satisfy a high data requirement size, various techniques are under development. A carrier aggregation (CA) technique, a cognitive radio (CR) technique, or the like for effectively using more frequency bands are under research. In addition, a multiple antenna technique, a multiple base station cooperation technique, or the like for increasing data capacity within a limited frequency are under research. That is, eventually, the wireless communication system will be evolved in a direction of increasing density of nodes capable of accessing to an area around a user. A wireless communication system having nodes with higher density can provide a higher performance through cooperation between the nodes. That is, a wireless communication system in which each node cooperates has a much higher performance than a wireless communication system in which each node operates as an independent base station (BS), advanced BS (ABS), node-B (NB), eNode-B (eNB), access point (AP), etc.

A distributed multi-node system (DMNS) comprising a plurality of nodes within a cell may be used to improve performance of a wireless communication system. The DMNS may include a distributed antenna system (DAS), a radio remote head (RRH), and so on. Also, standardization work is underway for various multiple-input multiple-output (MIMO) techniques and cooperative communication techniques already developed or applicable in a future so that they can be applied to the DMNS.

A user equipment (UE) may transmit a channel quality indicator (CQI) indicating downlink channel status. For measuring the CQI, various kinds of reference signals (RSs) transmitted by the BS may be used.

A method for measuring the CQI efficiently in the DMNS is required.

SUMMARY OF THE INVENTION

The present invention provides a method and apparatus for measuring a channel quality indicator (CQI) in a wireless communication system. The present invention provides a method for measuring the CQI by using a demodulation reference signal (DMRS) within an enhanced physical downlink control channel (e-PDCCH) region.

In an aspect, a method for measuring, by a user equipment (UE), a channel quality indicator (CQI) in a wireless communication system is provided. The method includes receiving from a base station at least one of a cell-specific reference signal (CRS) and a channel state information reference signal (CSI RS) transmitted in a cell-specific manner, receiving from the base station a demodulation reference signal (DMRS) transmitted in a UE-specific manner in an enhanced physical downlink control channel (e-PDCCH) region configured within a physical downlink shared channel (PDSCH) region, and measuring the CQI based on either at least one of the CRS and the CSI RS or the DMRS according to a command of the base station.

In another aspect, a user equipment (UE) for measuring a channel quality indicator (CQI) in a wireless communication system is provided. The UE includes a radio frequency (RF) unit for transmitting or receiving a radio signal, and a processor connected to the RF unit, and configured to receive from a base station at least one of a cell-specific reference signal (CRS) and a channel state information reference signal (CSI RS) transmitted in a cell-specific manner, receive from the base station a demodulation reference signal (DMRS) transmitted in a UE-specific manner in an enhanced physical downlink control channel (e-PDCCH) region configured within a physical downlink shared channel (PDSCH) region, and measure the CQI based on either at least one of the CRS and the CSI RS or the DMRS according to a command of the base station.

The CQI can be measured more accurately.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). $3^{rd}$ generation partnership project (3GPP) long term evolution (LTE) is part of an evolved UMTS (E-UMTS) using the E-UTRA, which employs the OFDMA in downlink and the SC-FDMA in uplink. LTE-advanced (LTE-A) is an evolution of 3GPP LTE.

Hereinafter, for clarification, LTE-A will be largely described, but the technical concept of the present invention is not meant to be limited thereto.

Figure 1:
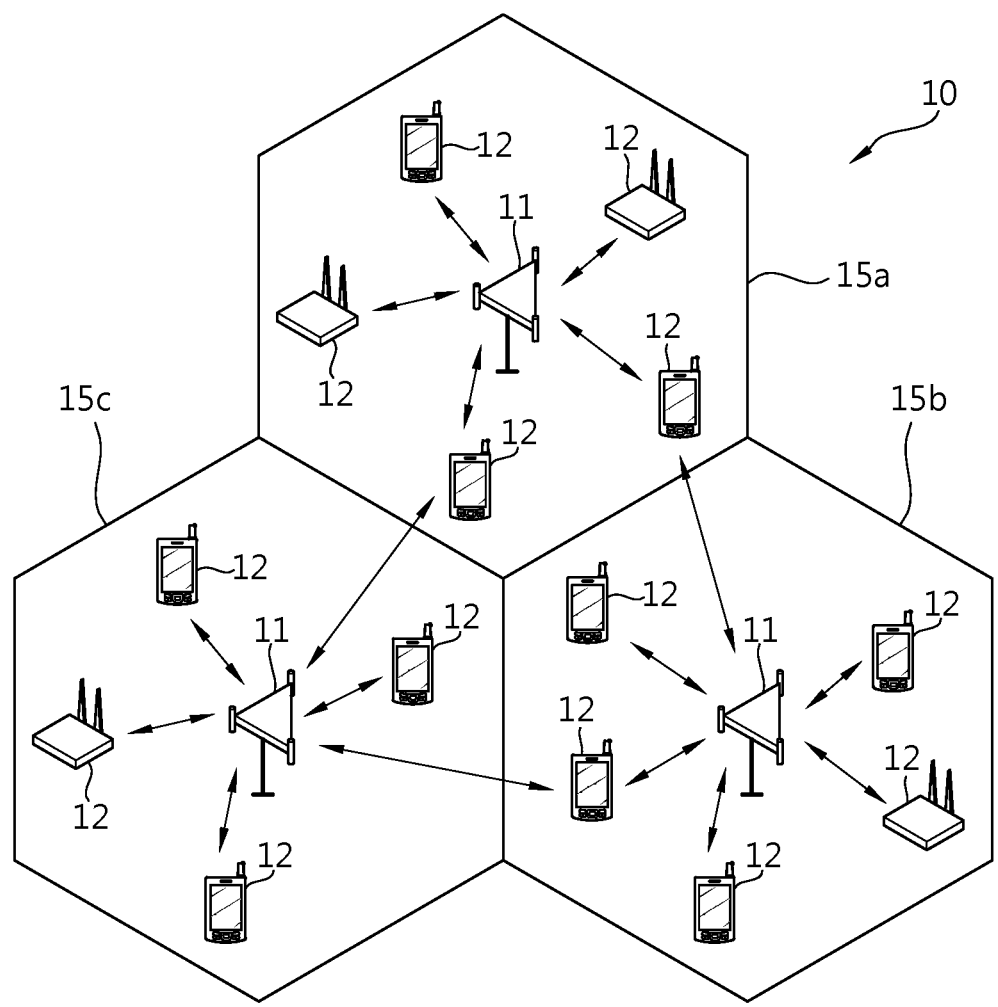
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile user equipment (MT), user equipment (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
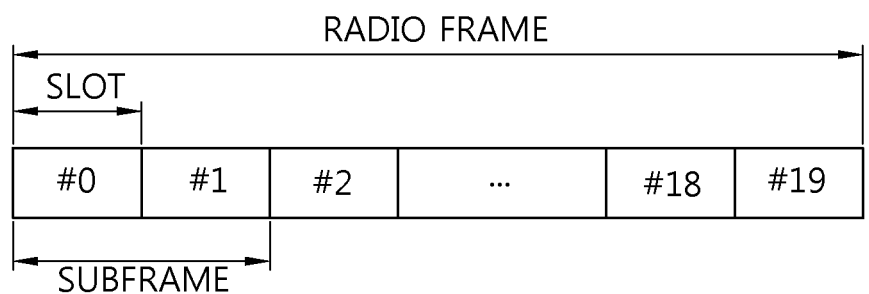
FIG. 2 shows a structure of a radio frame in 3GPP LTE.

FIG. 2 shows a structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-March). Referring to FIG. 2, the radio frame includes 10 subframes, and one subframe includes two slots. The slots in the radio frame are numbered by #0 to #19. A transmission time interval (TTI) is a basic scheduling unit for data transmission. In 3GPP LTE, one TTI may be equal to a time taken for transmitting one subframe. A radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE cannot be simultaneously performed. In a TDD system in which an uplink transmission and a downlink transmission are discriminated in units of subframes, the uplink transmission and the downlink transmission are performed in different subframes.

Figure 3:
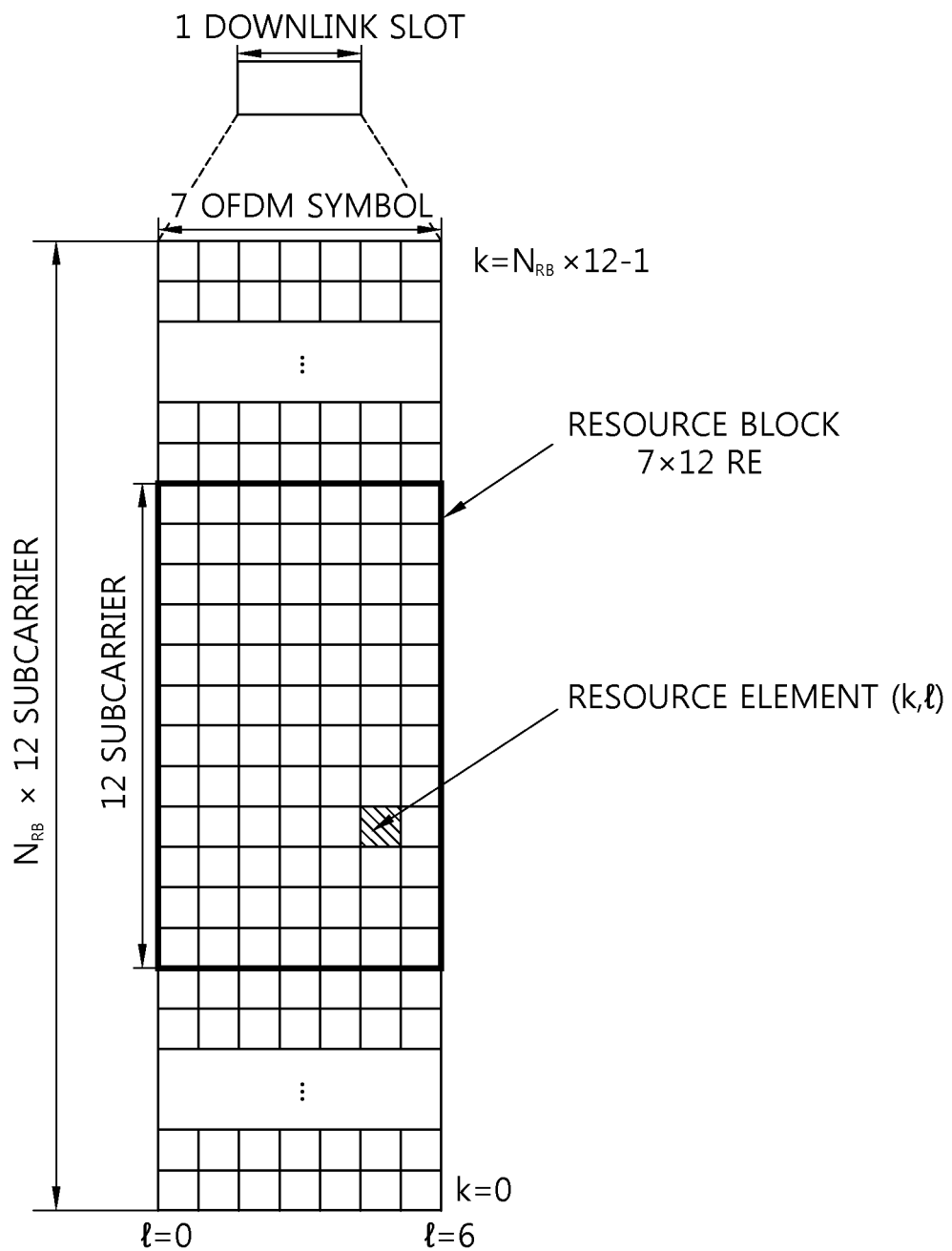
FIG. 3 shows an example of a resource grid of a single downlink slot.

FIG. 3 shows an example of a resource grid of a single downlink slot.

A downlink slot includes a plurality of OFDM symbols in the time domain and NRB number of resource blocks (RBs) in the frequency domain. The NRB number of resource blocks included in the downlink slot is dependent upon a downlink transmission bandwidth set in a cell. For example, in an LTE system, NRB may be any one of 6 to 110. One resource block includes a plurality of subcarriers in the frequency domain. An uplink slot may have the same structure as that of the downlink slot.

Each element on the resource grid is called a resource element. The resource elements on the resource grid can be identified by a pair of indexes (k,l) in the slot. Here, k (k=0, . . . , NRB×12-1) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a CP, frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
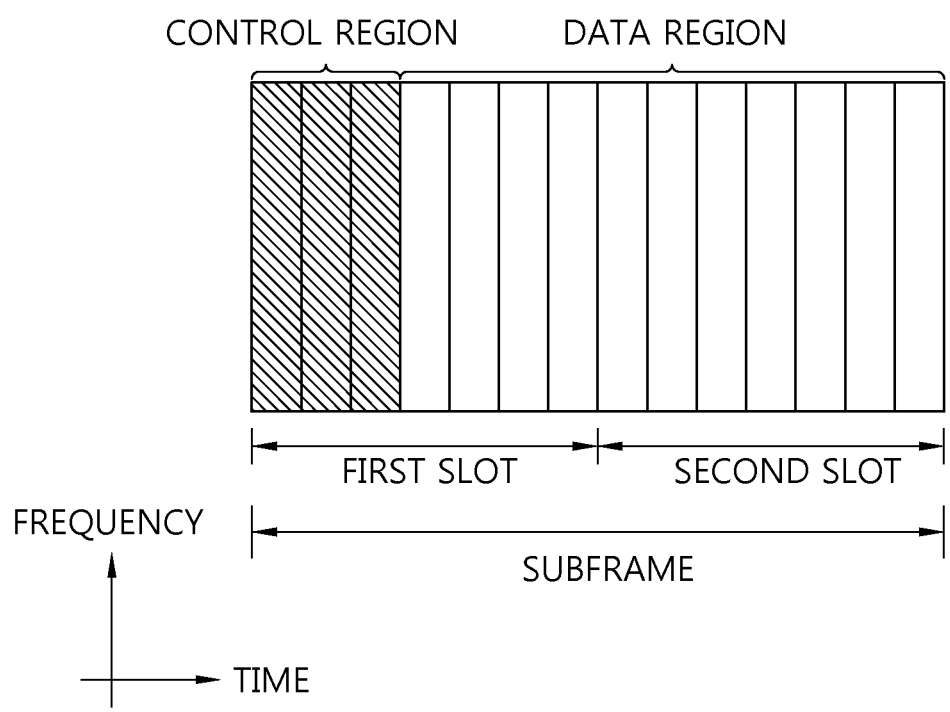
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to 9 resource element groups (REG) including respectively 4 resource elements. 4 quadrature phase shift keying (QPSK) symbols are mapped to each REG. Resource elements occupied by reference signals (RS) are not included in the REG, and the total number of REGs within a given OFDM symbol may be determined according to whether a cell-specific RS (CRS) exists. The format of the PDCCH and the number of bits of the possible PDCCH are determined according to the correlation between the number CCEs and the coding rate provided by the CCEs. The number of CCEs used for transmission of a specific PDCCH may be determined by the base station according to the channel situation. For example, the PDCCH for the UE having a superior channel state may use only one CCE. The PDCCH for the UE having an inferior channel state may need 8 CCEs in order to obtain sufficient robustness. Furthermore, the transmission power of the PDCCH may be adjusted according to the channel state. Table 1 shows supported PDCCH formats and a number of CCEs corresponding to each PDCCH format, etc.

TABLE 1

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
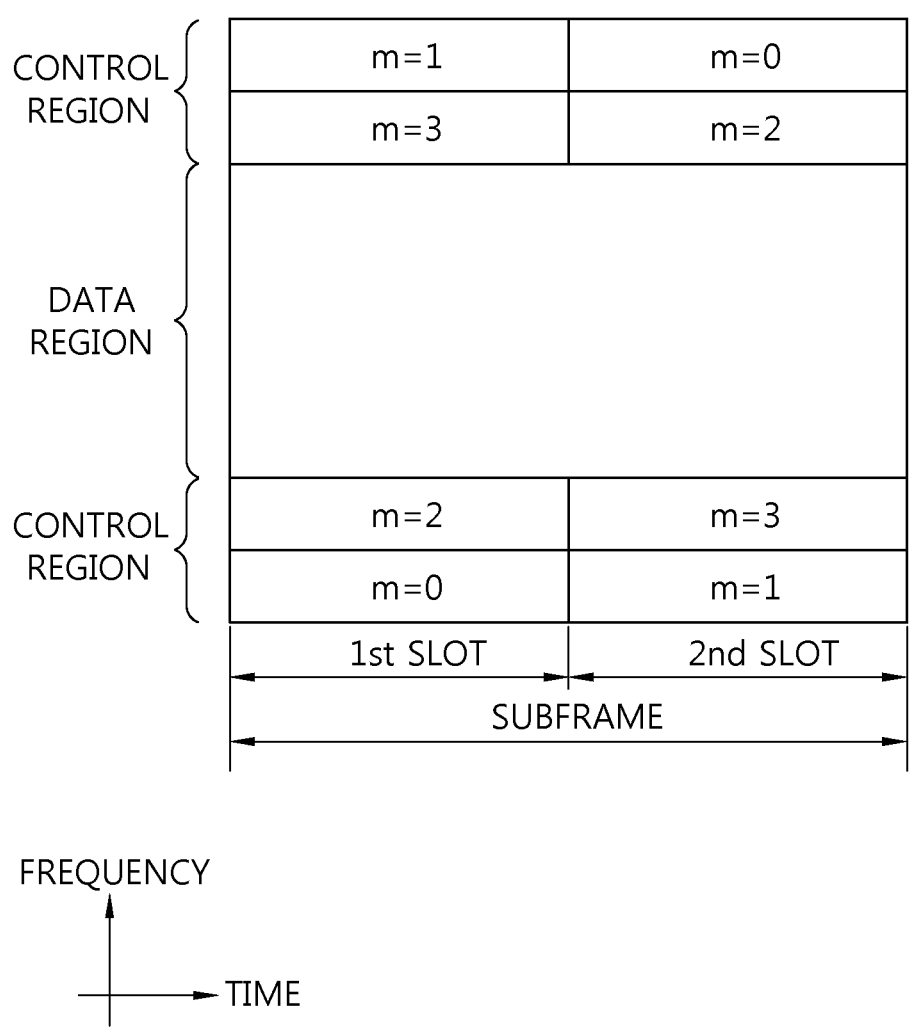
FIG. 5 shows a structure of an uplink subframe.

FIG. 5 shows a structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH for a UE is allocated by a pair of RBs in a subframe. The resource blocks belonging to the pair of RBs occupy different subcarriers in first and second slots, respectively. The frequency occupied by the RBs belonging to the pair of RBs is changed based on a slot boundary. This is said that the pair of RBs allocated to the PUCCH is frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

To improve a performance of the wireless communication system, a technique is evolved in a direction of increasing density of nodes capable of accessing to an area around a user. A wireless communication system having nodes with higher density can provide a higher performance through cooperation between the nodes.

Figure 6:
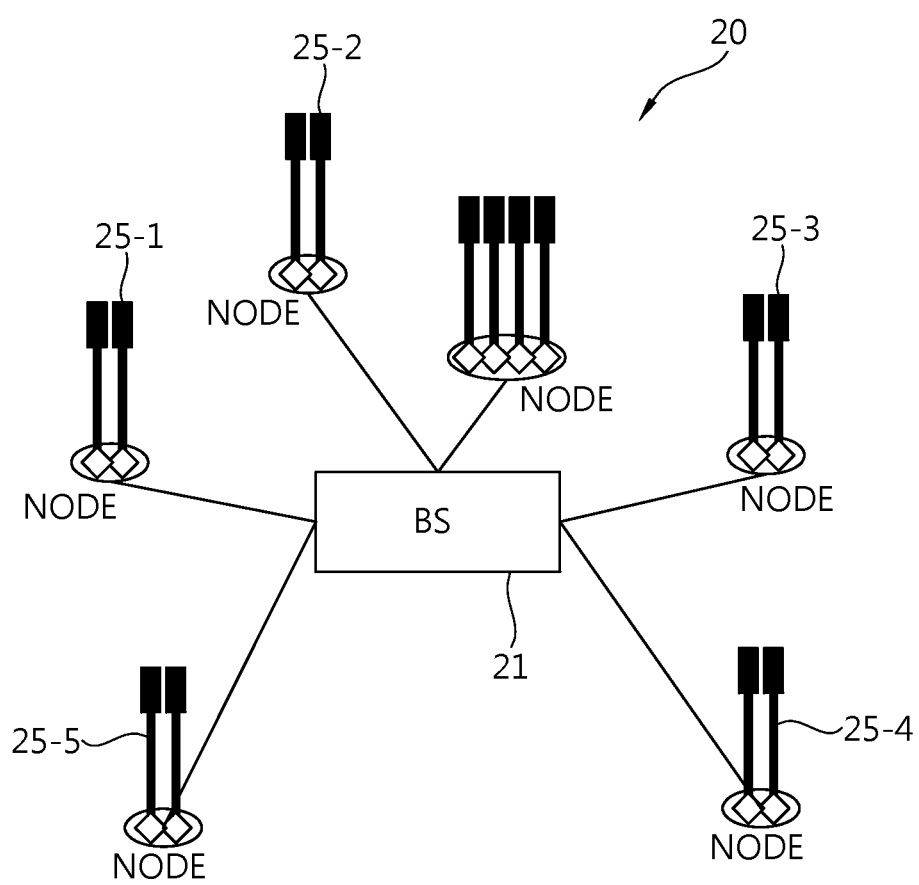
FIG. 6 shows an example of a multi-node system.

FIG. 6 shows an example of a multi-node system.

Referring to FIG. 6, a multi-node system 20 may consist of one BS 21 and a plurality of nodes 25-1, 25-2, 25-3, 25-4, and 25-5. The plurality of nodes 25-1, 25-2, 25-3, 25-4, and 25-5 may be managed by one BS 21. That is, the plurality of nodes 25-1, 25-2, 25-3, 25-4, and 25-5 operate as if they are a part of one cell. In this case, each of the nodes 25-1, 25-2, 25-3, 25-4, and 25-5 may be allocated a separate node identifier (ID), or may operate as if it is a part of an antenna group without an additional node ID. In this case, the multi-node system 20 of FIG. 6 may be regarded as a distributed multi node system (DMNS) which constitutes one cell.

Alternatively, the plurality of nodes 25-1, 25-2, 25-3, 25-4, and 25-5 may have separate cell IDs and perform a handover (HO) and scheduling of the UE. In this case, the multi-node system 20 of FIG. 6 may be regarded as a multi-cell system. The BS 21 may be a macro cell. Each node may be a femto cell or pico cell having cell coverage smaller than cell coverage of a macro cell. As such, if a plurality of cells is configured in an overlaid manner according to coverage, it may be called a multi-tier network.

In FIG. 6, each of the nodes 25-1, 25-2, 25-3, 25-4, and 25-5 may be any one of a BS, a Node-B, an eNode-B, a pico cell eNB (PeNB), a home eNB (HeNB), a remote radio head (RRH), a relay station (RS) or repeater, and a distributed antenna. At least one antenna may be installed in one node. In addition, the node may be called a point. In the following descriptions, a node implies an antenna group separated by more than a specific interval in a DMNS. That is, it is assumed in the following descriptions that each node implies an RRH in a physical manner. However, the present invention is not limited thereto, and the node may be defined as any antenna group irrespective of a physical interval. For example, the present invention may be applied by considering that a node consisting of horizontal polarized antennas and a node consisting of vertical polarized antennas constitute a BS consisting of a plurality of cross polarized antennas. In addition, the present invention may be applied to a case where each node is a pico cell or femto cell having smaller cell coverage than a macro cell, that is, to a multi-cell system. In the following descriptions, an antenna may be replaced with an antenna port, virtual antenna, antenna group, as well as a physical antenna.

Figure 7:
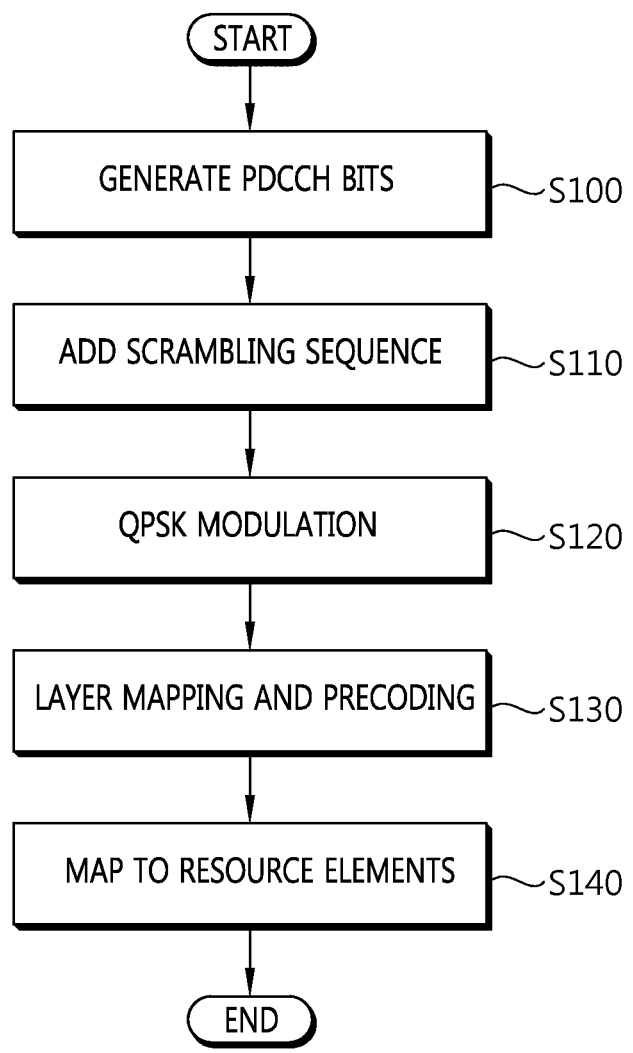
FIG. 7 shows an example of a process in which a PDCCH is mapped to resources.

FIG. 7 shows an example of a process in which a PDCCH is mapped to resources.

In step S100, a PDCCH bit is generated. The PDCCH bit may be denoted by the Equation 1 below.

$$b^{(0)}(0), \ldots, b^{(0)}(M_{bit}^{(0)}-1), b^{(1)}(0), \ldots, b^{(1)}(M_{bit}^{(1)}-1), \ldots, b^{(nPDCCH-1)}(0), \ldots, b^{(nPDCCH-1)}(M_{bit}^{(nPDCCH-1)}-1) \quad \text{<Equation 1>}$$

$M_{bit}^{(i)}$ represents the number of bits transmitted on the number i of the PDCCH within a one subframe. nPDCCH represents the number of PDCCHs transmitted within the subframe.

In step S110, a scrambling sequence is added to the generated PDCCH bit. The PDCCH bit to which the scrambling sequence is added may be denoted by the Equation 2 below.

$$\tilde{b}(0), \ldots, \tilde{b}(M_{tot}-1), \tilde{b}(i)=(b(i)+c(i))\bmod 2 \quad \text{<Equation 2>}$$

In step, S120, QPSK modulation is performed on the PDCCH bit to which the scrambling sequence is added. The modulation symbols generated by the QPSK modulation may be denoted by d(0), . . . , d($M_{sym}$b−1).

In step S130, A layer mapping and a precoding are performed on the modulation symbols. The modulation symbols in which the layer mapping and the precoding are performed may be denoted by the Equation 3 below.

$$y(i)=[y^{(0)}(i) \ldots y^{(P-1)}(i)]^T, i=0, \ldots, M_{symb}-1 \quad \text{<Equation 3>}$$

In step S140, the modulation symbols in which the layer mapping and the precoding are performed are mapped to resource elements. That is, y(i) in the Equation 3 is mapped to the resources on an antenna port p. After performing the sub-block interleaving, the modulation symbols are mapped to the REGs in the order of time and frequency. The PDCCH is transmitted on a set of antenna port that is identical to the antenna port on which a physical broadcast channel (PBCH) is transmitted.

In general, a reference signal (RS) is transmitted as a sequence. Any sequence may be used as a sequence used for an RS sequence without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Examples of the PN sequence include an m-sequence, a computer generated sequence, a Gold sequence, a Kasami sequence, etc. In addition, the RS sequence may be a cyclically shifted sequence.

A downlink RS may be classified into a cell-specific reference signal (CRS), a multimedia broadcast and multicast single frequency network (MBSFN) reference signal, a UE-specific reference signal, a positioning reference signal (PRS), and a channel state information reference signal (CSI RS). The CRS is an RS transmitted to all UEs in a cell, and is used in channel measurement for a channel quality indicator (CQI) feedback and channel estimation for a PDSCH. The MBSFN reference signal may be transmitted in a subframe allocated for MBSFN transmission. The UE-specific RS is an RS received by a specific UE or a specific UE group in the cell, and may also be called a demodulation reference signal (DMRS). The DMRS is primarily used for data demodulation of a specific UE or a specific UE group. The PRS may be used for location estimation of the UE. The CSI RS is used for channel estimation for a PDSCH of a LTE-A UE. The CSI RS is relatively sparsely deployed in a frequency domain or a time domain, and may be punctured in a data region of a normal subframe or an MBSFN subframe. If required, a channel quality indicator (CQI), a precoding matrix indicator (PMI), a rank indicator (RI), etc., may be reported from the UE through CSI estimation.

A CRS is transmitted from all of downlink subframes within a cell supporting PDSCH transmission. The CRS may be transmitted through antenna ports 0 to 3 and may be defined only for $\Delta f=15$ kHz. The CRS may be referred to Section 6.10.1 of 3GPP TS 36.211 V10.1.0 (2011-March).

Figure 8:
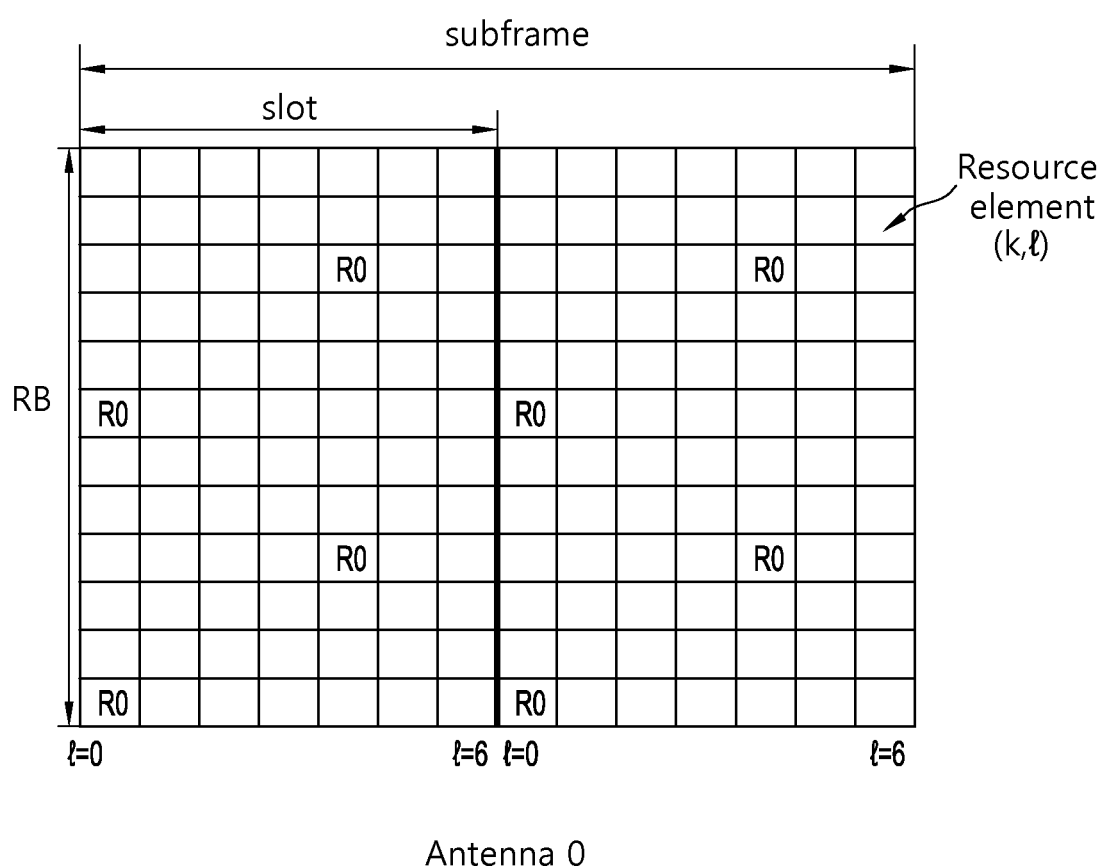
FIGS. 8 to 10 show examples of an RB to which a CRS is mapped.
Figure 9:
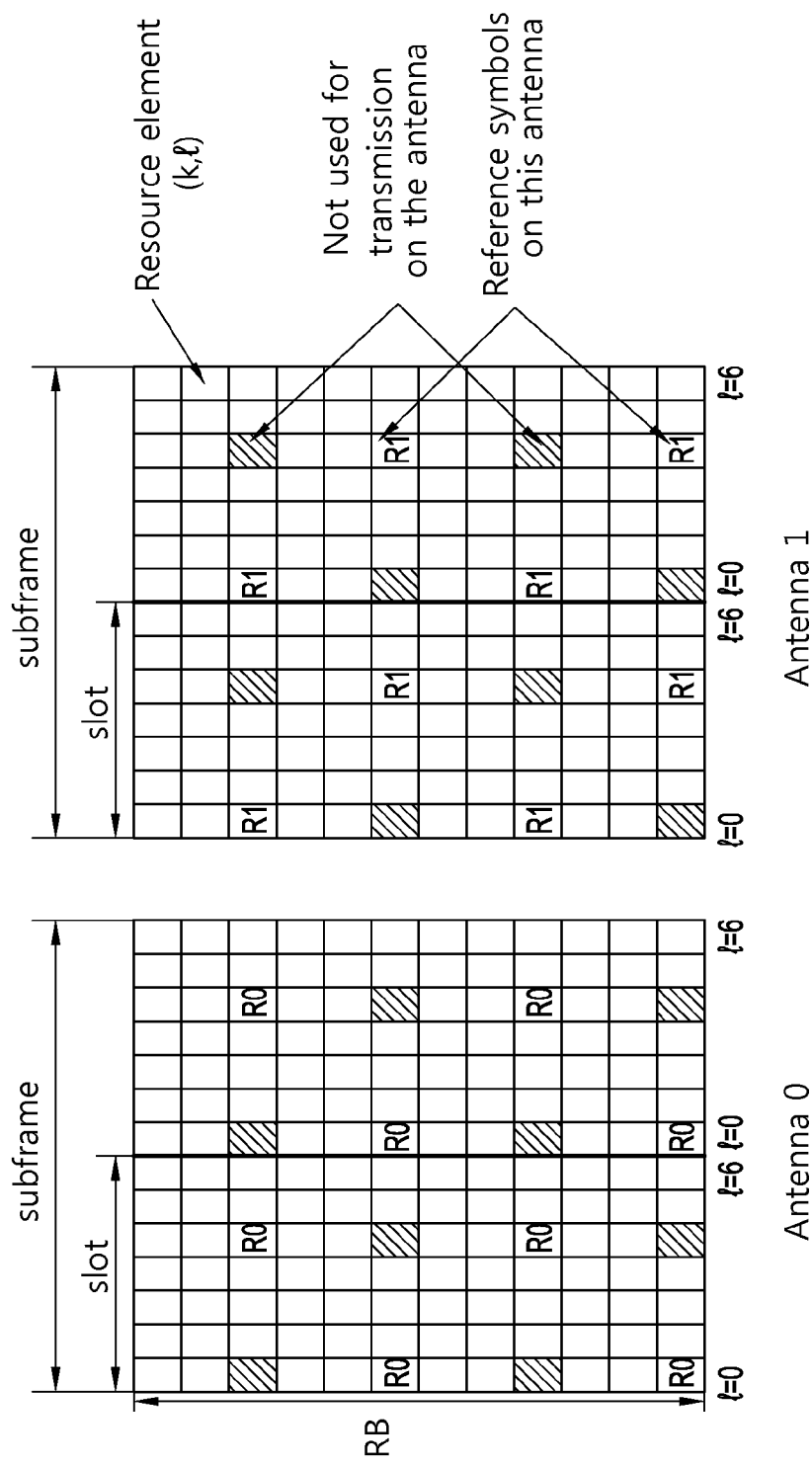
Figure 10:
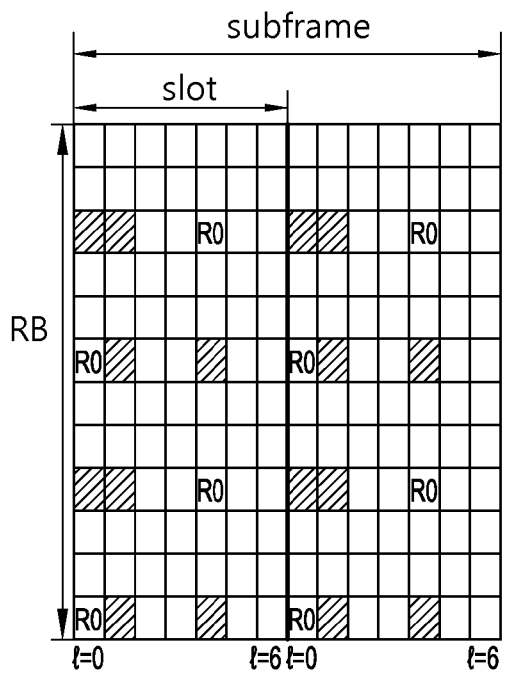
Figure 10:
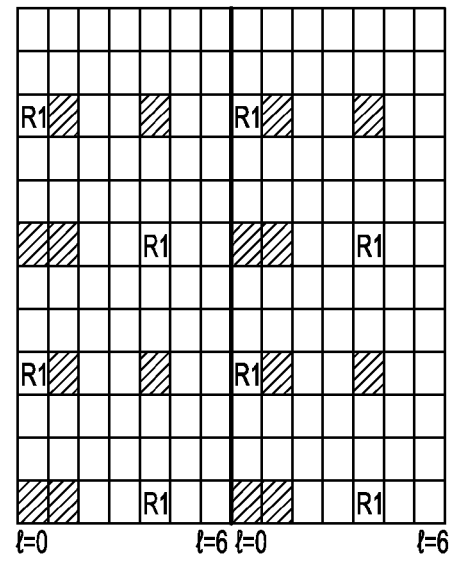
Figure 10:
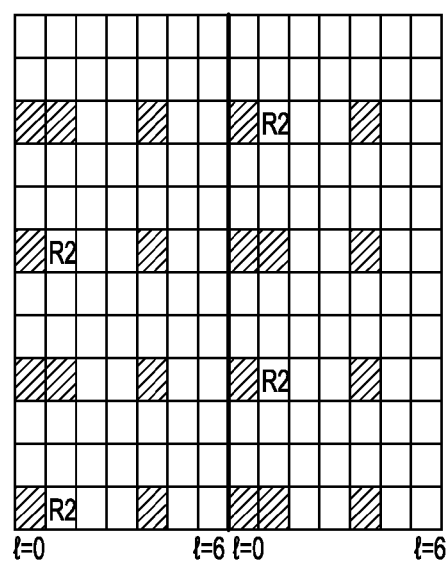
Figure 10:
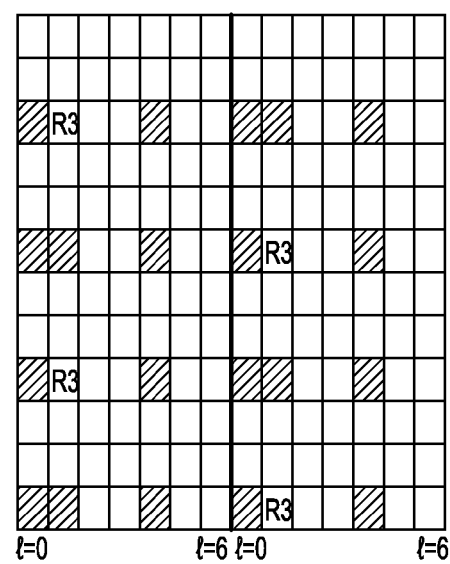

FIGS. 8 to 10 show examples of an RB to which a CRS is mapped.

FIG. 8 shows one example of a pattern in which a CRS is mapped to an RB when a base station uses a single antenna port. FIG. 9 shows one example of a pattern in which a CRS is mapped to an RB when a base station uses two antenna ports. FIG. 10 shows one example of a pattern in which a CRS is mapped to an RB when a base station uses four antenna ports. The CRS patterns may be used to support features of the LTE-A. For example, the CRS patterns may be used to support coordinated multi-point (CoMP) transmission/reception technique, spatial multiplexing, etc. Also, the CRS may be used for channel quality measurement, CP detection, time/frequency synchronization, etc.

Referring to FIGS. 8 to 10, in case the base station carries out multiple antenna transmission using a plurality of antenna ports, one resource grid is allocated to each antenna port. 'R0' represents a reference signal for a first antenna port. 'R1' represents a reference signal for a second antenna port. 'R2' represents a reference signal for a third antenna port. 'R3' represents a reference signal for a fourth antenna port. Positions of R0 to R3 within a subframe do not overlap with each other. l, representing the position of an OFDM symbol within a slot, may take a value ranging from 0 to 6 in a normal CP. In one OFDM symbol, a reference signal for each antenna port is placed apart by an interval of six subcarriers. The number of R0 and the number of R1 in a subframe are the same to each other while the number of R2 and the number of R3 are the same to each other. The number of R2 or R3 within a subframe is smaller than the number of R0 or R1. A resource element used for a reference signal of one antenna port is not used for a reference signal of another antenna port. This is intended to avoid generating interference among antenna ports.

The CRSs are always transmitted as many as the number of antenna ports regardless of the number of streams. The CRS has a separate reference signal for each antenna port. The frequency domain position and time domain position of the CRS within a subframe are determined regardless of UEs. The CRS sequence multiplied to the CRS is also generated regardless of UEs. Therefore, all of UEs within a cell may receive the CRS. However, it should be noted that the CRS position within a subframe and the CRS sequence may be determined according to cell IDs. The time domain position of the CRS within a subframe may be determined according to an antenna port number and the number of OFDM symbols within a resource block. The frequency domain position of the CRS within a subframe may be determined according to an antenna port number, cell ID, OFDM symbol index (l), a slot number within a radio frame, etc.

A two-dimensional CRS sequence may be generated by multiplication between symbols of a two-dimensional orthogonal sequence and symbols of a two-dimensional pseudo-random sequence. There may be three different two-dimensional orthogonal sequences and 170 different two-dimensional pseudo-random sequences. Each cell ID corresponds to a unique combination of one orthogonal sequence and one pseudo-random sequence. In addition, frequency hopping may be applied to the CRS. The period of frequency hopping pattern may be one radio frame (10 ms), and each frequency hopping pattern corresponds to one cell identity group.

A DMRS supports for PDSCH transmission, and is transmitted on the antenna port p=5, p=, 8 or p=7, 8, . . . , v+6. At this time, v represents the number of layers used for PDSCH transmission. The DMRS is transmitted to one UE through any of the antenna ports belonging to a set S, where S={7, 8, 11, 13} or S={9, 10, 12, 14}. The DMRS is defined for demodulation of PDSCH and valid only when transmission of PDSCH is associated with the corresponding antenna port. The DMRS is transmitted only from a RB to which the corresponding PDSCH is mapped. The DMRS, regardless of the antenna port, is not transmitted in a resource element to which either of a physical channel and a physical signal is transmitted. The DMRS may be referred to Section 6.10.3 of 3GPP TS 36.211 V10.1.0 (2011-March).

Figure 11:
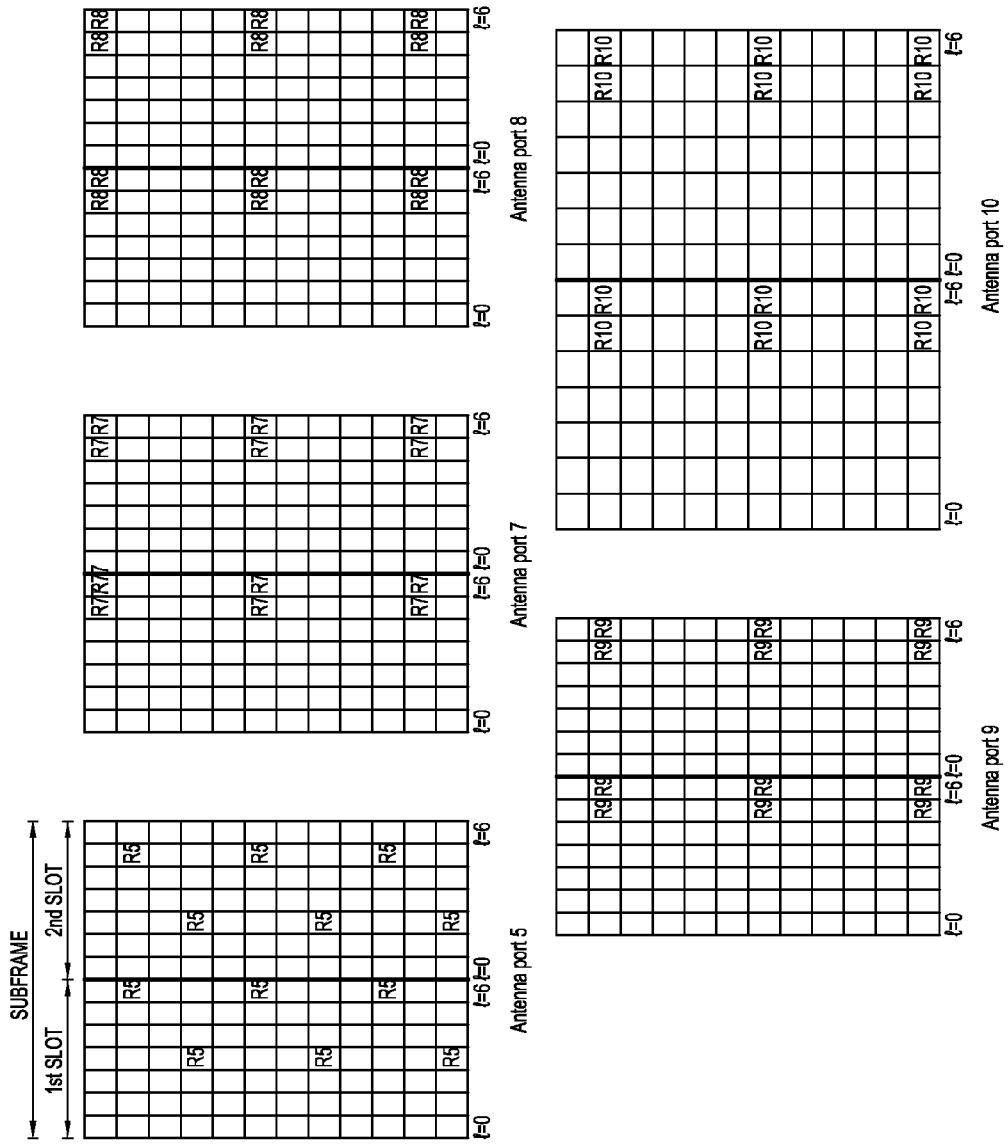
FIG. 11 shows an example of an RB to which a DMRS is mapped.

FIG. 11 shows an example of an RB to which a DMRS is mapped.

FIG. 11 shows resource elements used for the DMRS in a normal CP structure. Rp denotes resource elements used for DMRS transmission on an antenna port p. For example, R5 denotes resource elements used for DMRS transmission on an antenna port 5. Also, referring to FIG. 11, the DMRS for an antenna port 7 and 8 are transmitted through resource elements corresponding to a first, sixth, and eleventh sub-carriers (subcarrier index 0, 5, 10) of a sixth and seventh OFDM symbol (OFDM symbol index 5, 6) for each slot. The DMRS for the antenna port 7 and 8 may be identified by an orthogonal sequence of length 2. The DMRS for an antenna port 9 and 10 are transmitted through resource elements corresponding to a second, seventh, and twelfth sub-carriers (subcarrier index 1, 6, 11) of a sixth and seventh OFDM symbol (OFDM symbol index 5, 6) for each slot. The DMRS for the antenna port 9 and 10 may be identified by an orthogonal sequence of length 2. Since S={7, 8, 11, 13} or S={9, 10, 12, 14}, the DMRS for the antenna port 11 and 13 are mapped to resource elements to which the DMRS for the antenna port 7 and 8 are mapped, while the DMRS for the antenna port 12 and 14 are mapped to resource elements to which the DMRS for the antenna port 9 and 10 are mapped.

A CSI RS is transmitted through one, two, four, or eight antenna ports. The antenna ports used for each case is p=15, p=15, 16, p=15, . . . , 18, and p=15, . . . , 22, respectively. The CSI RS may be defined only $\Delta f=15$ kHz. The CSI RS may be referred to Section 6.10.5 of 3GPP TS 36.211 V10.1.0 (2011-March).

A CSI RS sequences may be based on a pseudo-random sequence which is generated from a seed based on a cell ID. Regarding transmission of the CSI RS, a maximum of 32 configurations different from each other may be taken into account to reduce inter-cell interference (ICI) in a multi-cell environment, including a heterogeneous network (HetNet) environment. The CSI RS configuration is varied according to the number of antenna ports within a cell and CP, and neighboring cells may have the most different configurations. Also, the CSI RS configuration may be divided into two types depending on a frame structure. The two types include a type applied to both of FDD frame and TDD frame and a type applied only to the TDD frame.

Figure 12:
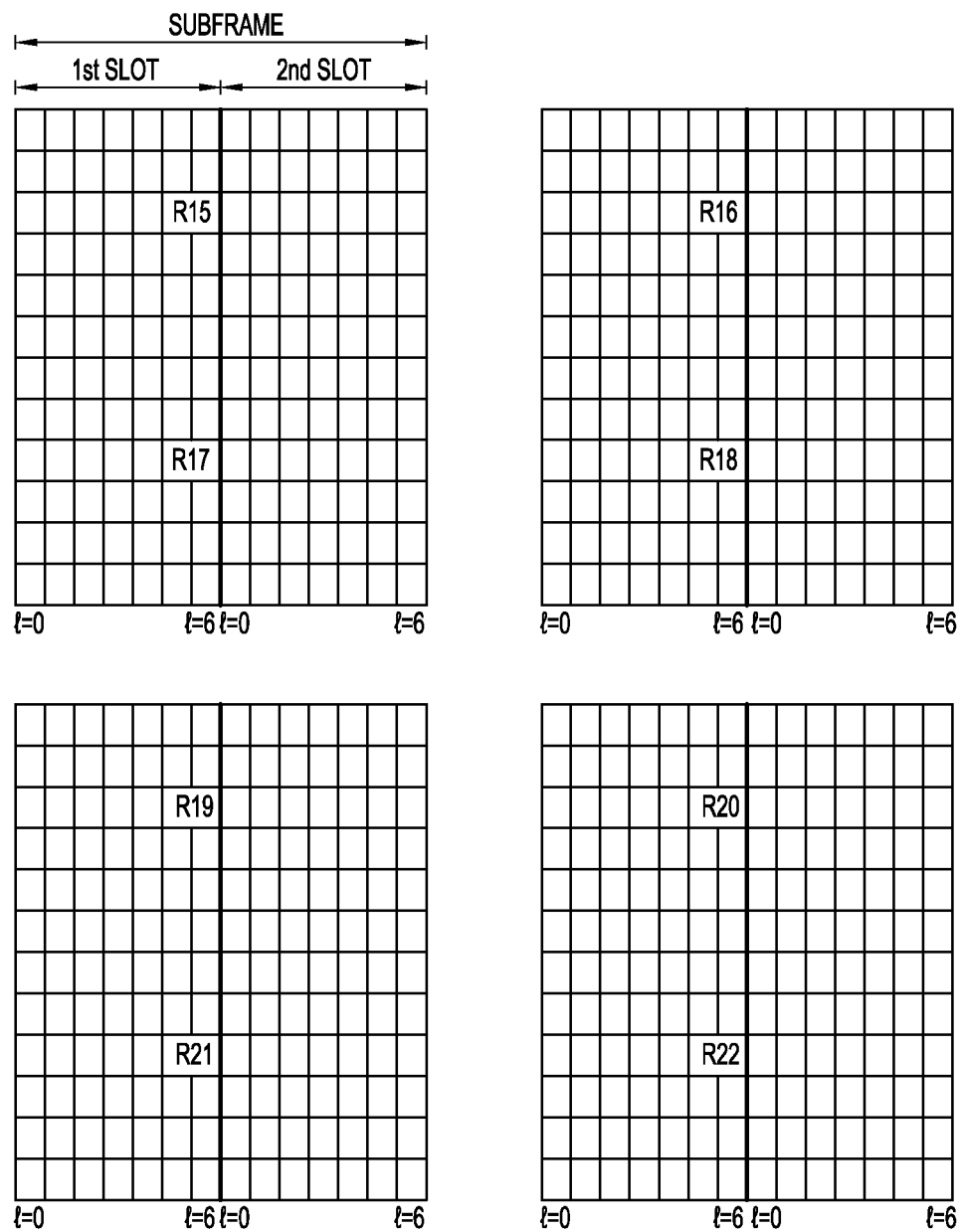
FIG. 12 shows an example of an RB to which a CSI-RS is mapped.

FIG. 12 shows an example of an RB to which a CSI-RS is mapped.

FIG. 12 shows resource elements used for the CSI-RS in a normal CP structure when CSI RS configuration index is zero. Rp denotes resource elements used for CSI-RS transmission on an antenna port p. Referring to FIG. 12, the CSI-RS for an antenna port 15 and 16 are transmitted through resource elements corresponding to a third subcarrier (subcarrier index 2) of a sixth and seventh OFDM symbol (OFDM symbol index 5, 6) of a first slot. The CSI-RS for an antenna port 17 and 18 is transmitted through resource elements corresponding to a ninth subcarrier (subcarrier index 8) of a sixth and seventh OFDM symbol (OFDM symbol index 5, 6) of the first slot. The CSI-RS for an antenna port 19 and 20 is transmitted through the same resource elements as the CSI-RS for an antenna port 15 and 16 is transmitted. The CSI-RS for an antenna port 21 and 22 is transmitted through the same resource elements as the CSI-RS for an antenna port 17 and 18 is transmitted.

Figure 13:
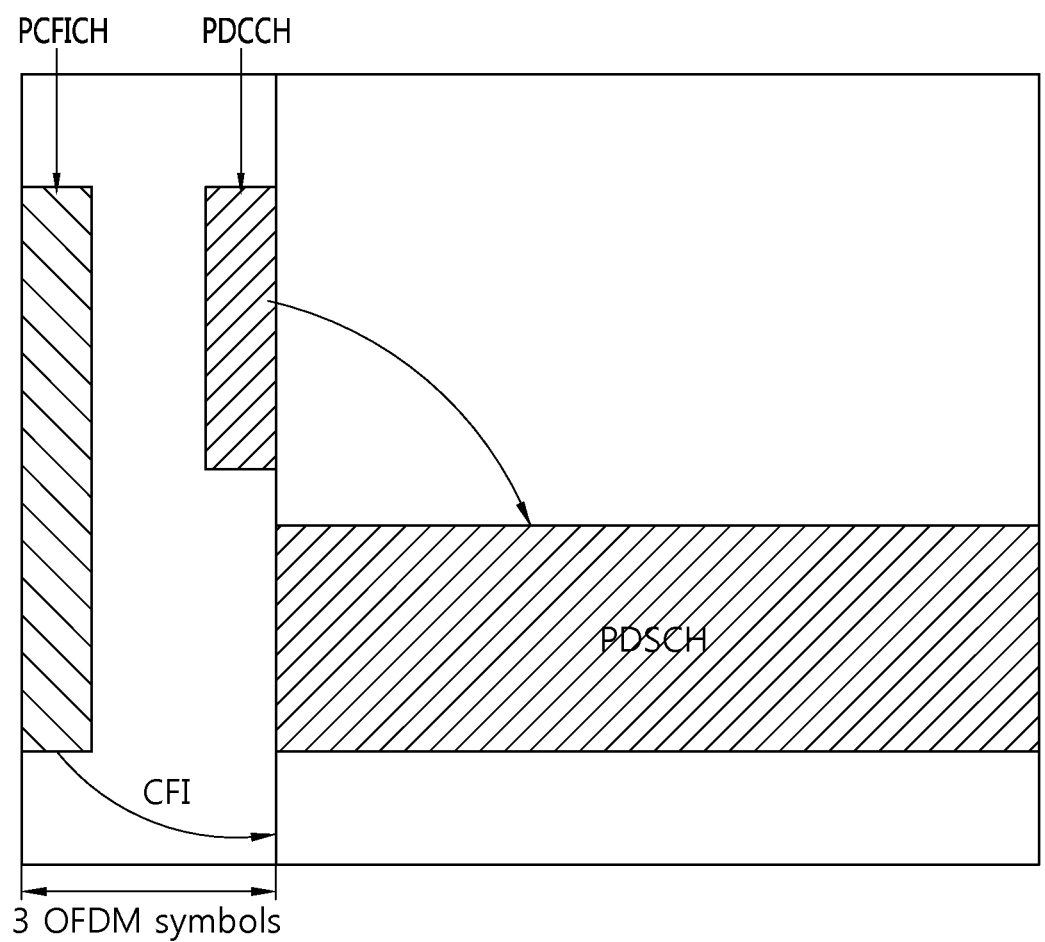
FIG. 13 shows an example where a PCFICH, PDCCH, and PDSCH are mapped to a subframe.

FIG. 13 shows an example where a PCFICH, PDCCH, and PDSCH are mapped to a subframe.

The 3GPP LTE allocates a PDCCH to transmit a downlink control signal intended for controlling UEs. The region to which PDCCHs of a plurality of UEs are mapped is called a PDCCH region or a control region. The PCFICH carries information about the number of OFDM symbols used for allocation of the PDCCH within a subframe. The information about the number of OFDM symbols to which the PDCCH is allocated is called a control formation indicator (CFI). All the UEs within a cell have to search the region to which the PDCCH is allocated, and accordingly, the CIF may be set to a cell-specific value. In general, the control region to which the PDCCH is allocated is allocated to the OFDM symbols at the forefront of a downlink subframe, and the PDCCH may be allocated to a maximum of three OFDM symbols.

Referring to FIG. 13, CIF is set to 3, and accordingly, the PDCCH is allocated to the aforementioned three OFDM symbols within a subframe. The UE detects its own PDCCH within the control region and finds its own PDSCH through the detected PDCCH in the corresponding control region.

The PDCCH in the prior art was transmitted by using transmission diversity in a confined region and does not employ various techniques supporting the PDSCH such as beamforming, multi-user multiple-input multiple-output (MU-MIMO), and best band selection. Also, in case a distributed multi-node system is introduced for system performance enhancement, capacity of the PDCCH becomes short if cell IDs of a plurality of nodes or a plurality of RRHs are identical to each other. Therefore, a new control channel may be introduced in addition to the existing PDCCH. Hereinafter, a control channel newly defined is called an enhanced PDCCH (e-PDCCH). In the description below, e-PDCCH may be used mixed with an ePDCCH or EPDCCH. The e-PDCCH may be allocated in a data region rather than the existing control region. As the e-PDCCH is defined, a control signal for each node is transmitted for each UE, and the problem of shortage of the PDCCH region can be solved.

As the control region to which the PDCCH is allocated is specified by the PCFICH, a new channel specifying a region to which the e-PDCCH is allocated may be defined. In other words, an enhanced PCFICH (e-PCFICH) may be newly defined, which specifies a region to which the e-PDCCH is allocated. The e-PCFICH may carry part or all of information required for detecting the e-PDCCH. The e-PDCCH may be allocated to a common search space (CSS) within the existing control region or a data region.

Figure 14:
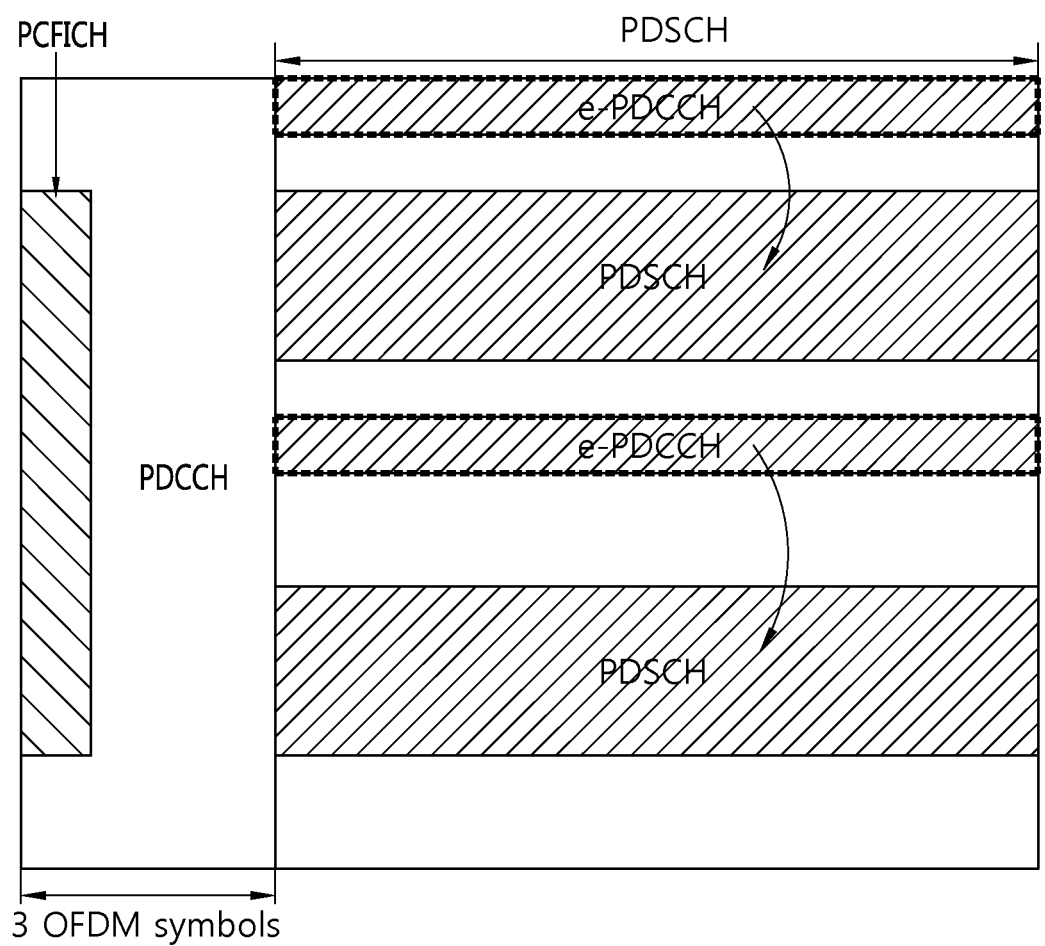
FIG. 14 shows an example of resource allocation through an e-PDCCH.

FIG. 14 shows an example of resource allocation through an e-PDCCH.

The e-PDCCH may be allocated to part of a data region rather than the conventional control region. The e-PDCCH is not provided for the existing legacy UEs, and those UEs supporting the 3GPP LTE rel-11 (hereinafter, they are called rel-11 UEs) may search for the e-PDCCH. The rel-11 UE performs blind decoding for detection of its own e-PDCCH. The information about the minimum region required for detection of the e-PDCCH may be transmitted through a newly defined e-PCFICH or the existing PDCCH. A PDSCH may be scheduled by the e-PDCCH allocated to the data region. A base station may transmit downlink data to each UE through the scheduled PDSCH. In FIG. 14, it is exemplified that the e-PDCCH schedules a PDSCH in the same subframe, but e-PDCCH may schedule a PDSCH allocated to another subframe. However, if the number of UEs connected to each node is increased, the portion of the data region occupied by the e-PDCCH is enlarged. Therefore, the number of blind decoding that has to be performed by the UE is also increased, thus increasing degree of complexity.

Meanwhile, wireless communication systems including relay stations are under development recently. A relay station is intended to extend cell coverage and improve transmission performance. A base station may achieve an effect of extending cell coverage by servicing UEs located at the boundaries of the base station through the relay station. Also, as the relay station improves reliability of signal transmission between the base station and UEs, transmission capacity may be increased. The relay station may be utilized in such a case where a UE is located in a shadow region though the UE may stay within coverage of the base station. The uplink and the downlink between the base station and the relay station are backhaul links while the uplink and the downlink between the base station and a UE, or between the relay station and a UE are access links. Hereinafter, a signal transmitted through the backhaul link is called a backhaul signal, and a signal transmitted through the access link is called an access signal.

Relay zones may be defined in a wireless communication system including relay stations. A relay zone refers to an interval within a downlink subframe transmitted by a base station, where transmission of a control channel (hereinafter, R-PDCCH) for a relay station or transmission of a data channel (hereinafter, R-PDSCH) for the relay station is performed. In other words, the relay zone indicates an interval within a downlink subframe, where backhaul transmission is performed. Transmission between the base station and the relay station is restricted only in the relay zone within a slot. A PDSCH for transmission between the base station and the relay station is processed in the same way as the PDSCH is processed when the relay station is not employed, and the processed PDSCH is mapped to resource elements. However, the corresponding PDSCH is mapped only to the resource elements within the relay region, and if the R-PDCCH is allocated to a first slot of an RB pair, the corresponding PDSCH is not mapped to the first slot of the RB pair.

The R-PDCCH carries DCI for the relay station. The R-PDCCH may be allocated to OFDM symbols of a first slot ranging from the fourth to the last OFDM symbol or OFDM symbols of a second slot ranging from the first to the last OFDM symbol. In frequency domain, a plurality of virtual RBs (VRBs) to which the R-PDCCH can be allocated may be configured by a higher layer. Without being cross-interleaved with other R-PDCCHs in a given physical RB (PRB), the R-PDCCH may be transmitted on one or more PRBs. In other cases, a plurality of R-PDCCHs may be cross-interleaved with each other in one or more PRBs.

Figure 15:
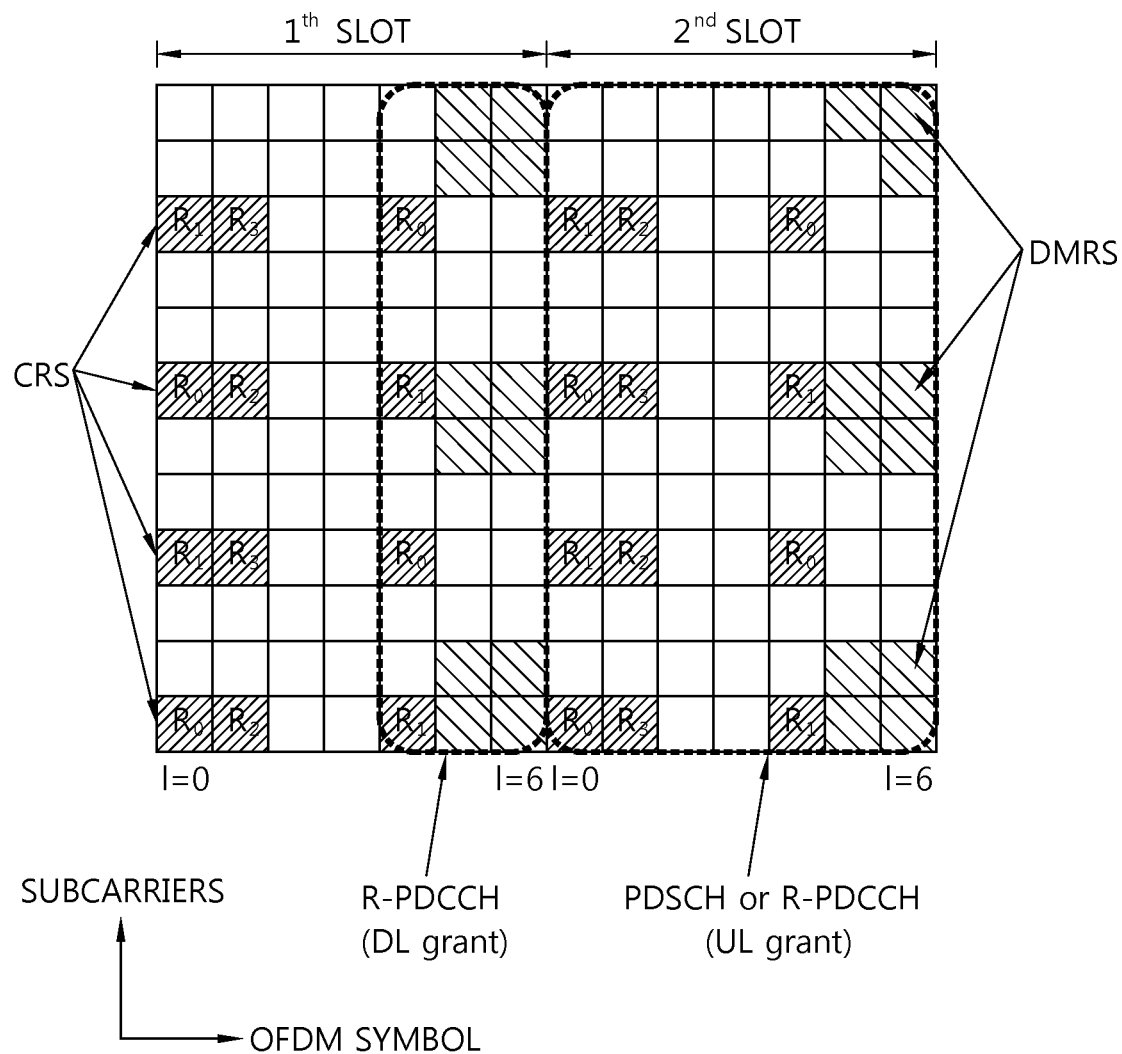
FIG. 15 shows an example of an R-PDCCH allocated to an RB.

FIG. 15 shows an example of an R-PDCCH allocated to an RB.

Referring to FIG. 15, only a DL grant is allocated to a first slot of the RB, and a UL grant or a PDSCH is allocated to a second slot. In this case, the R-PDCCH may be allocated to the remaining REs other than the REs to which a control region, CRS, and DMRS are mapped. Both of the CRS and DMRS may be used for demodulation of the R-PDCCH. If the DMRS is used for demodulation of the R-PDCCH, the antenna port 7 and a scrambling ID (SCID) of 0 may be used. On the other hand, if the CRS is used for demodulation of the R-PDCCH, the antenna port 0 may be used when only one PBCH transmission antenna is employed, whereas if two or four PBCH transmission antennas are used, Tx diversity mode is activated, and antenna ports 0-1 or 0-3 may be utilized.

In allocating an e-PDCCH newly defined for a multi-node system, the structure of the existing R-PDCCH described in FIG. 15 may be re-used. In other words, only the DL grant may be allocated to the first slot in the RB, and the UL grant or the PDSCH may be allocated in the second slot. Also, the e-PDCCH may be allocated to the remaining REs other than the REs to which the control region, CRS, and DMRS are mapped. By adopting the existing structure, the e-PDCCH may be allocated without exerting a large influence on the existing standards.

Hereinafter, channel quality indicator (CQI) is described. It may be referred to Section 7.2.3 of 3GPP TS 36.213 V10.1.0 (2011-March).

For a UE in transmission mode 9 when parameter pmi-RT-Report is configured by higher layers, the UE shall derive the channel measurements for computing the CQI value reported in uplink subframe n based on only the CSI RS. For a UE in transmission mode 9 when the parameter pmi-RT-Report is not configured by higher layers or in other transmission modes, the UE shall derive the channel measurements for computing CQI based on CRS. That is, the UE may measure CQI based on the CRS or the CSI RS.

A combination of modulation scheme and transport block size may correspond to a CQI index. The combination could be signalled for transmission on the PDSCH in the CSI reference resource according to the relevant transport block size table. The modulation scheme is indicated by the CQI index. The combination of transport block size and modulation scheme when applied to the reference resource may result in the effective channel code rate which is the closest possible to the code rate indicated by the CQI index.

The CSI reference resource may be defined as follows. In the frequency domain, the CSI reference resource may be defined by the group of downlink PRBs corresponding to the band to which the derived CQI value relates. In the time domain, the CSI reference resource may be defined by a single downlink subframe $n-n_{CQI\_ref}$. For periodic CSI reporting, $n_{CQI\_ref}$ may be the smallest value greater than or equal to 4, such that it corresponds to a valid downlink subframe. For aperiodic CSI reporting, $n_{CQI\_ref}$ may be such that the reference resource is in the same valid downlink subframe as the corresponding CSI request in an uplink DCI format. For aperiodic CSI reporting, $n_{CQI\_ref}$ may be equal to 4 and downlink subframe $n-n_{CQI\_ref}$ may correspond to a valid downlink subframe. In this case, downlink subframe $n-n_{CQI\_ref}$ may be received after the subframe with the corresponding CSI request in a random access response grant.

A downlink subframe in a serving cell shall be considered to be valid if:
1) it is configured as a downlink subframe for that UE, and
2) except for transmission mode 9, it is not an MBSFN subframe, and
3) it does not contain a DwPTS field in case the length of DwPTS is $7680*T_s$ and less, and
4) it does not fall within a configured measurement gap for that UE, and
5) for periodic CSI reporting, it is an element of the CSI subframe set linked to the periodic CSI report when that UE is configured with CSI subframe sets. If there is no valid downlink subframe for the CSI reference resource in a serving cell, CSI reporting is omitted for the serving cell in uplink subframe n.

Further, in the layer domain, the CSI reference resource may be defined by any RI and PMI on which the CQI is conditioned.

In the CSI reference resource, the UE shall assume the following for the purpose of deriving the CQI index:
1) The first 3 OFDM symbols are occupied by control signaling
2) No resource elements used by primary synchronization signal (PSS) or secondary synchronization signal (SSS) or physical broadcast channel (PBCH)
3) CP length of the non-MBSFN subframes
4) Redundancy version 0
5) If CSI-RS is used for channel measurements, the ratio of PDSCH energy per resource element (EPRE) to CSI-RS EPRE is given as $P_c$
6) For transmission mode 9 CSI reporting, if UE is configured for PMI/RI reporting, assume DMRS overhead is consistent with most recent reported rank
7) Assume no REs allocated for CSI-RS and zero-power CSI-RS
8) Assume no REs allocated for PRS
9) The PDSCH transmission scheme given by Table 2 depending on the transmission mode currently configured for the UE.
10) If CRS is used for channel measurements, the ratio of PDSCH EPRE to CRS EPRE is given as $\rho_A$ and $\rho_B$. $\rho_A$ is given as $\rho_A = P_A + \Delta_{offset} + 10\log_{10}(2)$ [dB] if the UE is configured with transmission mode 2 or 3 with 4 cell-specific antenna ports, and the associated RI is equal to one. $\rho_A$ is given as $\rho_A = P_A + \Delta_{offset}$ [dB] for any modulation scheme and any number of layers, otherwise. The shift $\Delta_{offset}$ is given by the parameter nomPDSCH-RS-EPRE-Offset which is configured by higher-layer signaling.

Table 2 shows PDSCH transmission scheme assumed for CSI reference resource

TABLE 2

| Transmission mode | Transmission scheme of PDSCH |
|---|---|
| 1 | Single-antenna port, port 0 |

TABLE 2-continued

| Transmission mode | Transmission scheme of PDSCH |
|---|---|
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |
| 8 | If the UE is configured without PMI/RI reporting: if the number of PBCH antenna ports is one, single-antenna port, port 0; otherwise transmit diversity<br>If the UE is configured with PMI/RI reporting: closed-loop spatial multiplexing |
| 9 | If the UE is configured without PMI/RI reporting: if the number of PBCH antenna ports is one, single-antenna port, port 0; otherwise transmit diversity<br>Closed-loop spatial multiplexing with up to 8 layer transmission, ports 7-14 (see subclause 7.1.5B) |

Hereinafter, a method for measuring a CQI according to an embodiment of the present invention is described.

As described above, the 3GPP LTE system employs a CRS or a CSI RS for CQI measurement. Likewise, the IEEE 802.16e/m system employs a preamble or midamble for CQI measurement. To implement a more efficient CQI measurement method, however, a CQI measurement method utilizing a UE-specific reference signal rather than a cell-specific reference signal may be employed. The UE-specific reference signal may be the DMRS in the 3GPP system, while it may correspond to a pilot signal in the case of the IEEE 802.16m. Hereinafter, it is assumed that the DMRS takes the role of a UE-specific reference signal. However, embodiments of the present invention described below are not limited to the assumption above. When a DMRS is used to measure CQI, the DMRS in the e-PDCCH region in particular may be used to measure the CQI. Hereinafter, it is assumed that the DMRS in the e-PDCCH region refers to a reference signal used to demodulate the e-PDCCH region. A different name may be used to reference the DMRS in the e-PDCCH region. However, a specific name does not limit the application range of embodiments of the present invention. The DMRS in the e-PDCCH region may use antenna ports different from the antenna ports, p=5, p=7, 8, or p=7, 8, . . . , v+6, used by an existing DMRS. The antenna ports used by the DMRS in the e-PDCCH region may be called e-PDCCH ports.

At first, an e-PDCCH configuration method for a CQI measurement method according to an embodiment of the present invention is described.

First, the e-PDCCH may be allocated to multiple PRBs. Each e-PDCCH may be allocated in localized manner within multiple PRBs. That is, the e-PDCCH may be allocated physically contiguously in the time domain or the frequency domain. Or, each e-PDCCH may be allocated in distributed manner within the multiple PRBs. That is, the e-PDCCH may be allocated with physically distributed in the time domain or the frequency domain.

The region to which the e-PDCCH of one UE can be allocated may be either of the first region or the second region, or both of the first region and the second region. The first region and the second region may be distinguished by the standard described below.

1) The first region to which the e-PDCCH of the minimum aggregation level is transmitted from a PRB or a pair of PRBs and the second region to which the e-PDCCH of the minimum aggregation level is transmitted from multiple PRBs or multiple pair of PRBs: The first region may correspond to the region to which the e-PDCCH is allocated in localized manner as described above, and the second region may correspond to the region to which the e-PDCCH is allocated in distributed manner as described above.

2) The first region in which the e-PDCCH for one UE is transmitted only through a part of antenna ports among the N number of antenna ports given to the e-PDCCH set region and the second region in which the e-PDCCH for one UE is transmitted through all given antenna ports: The antenna port given to the e-PDCCH region may be the e-PDCCH port which is the antenna port for the e-PDCCH.

3) The first region in which the UE of transmission mode which corresponds to the closed-loop (CL)-MIMO searches and the second region in which the UE of transmission mode which detects DCI format 1A or corresponds to open-loop (OL)-MIMO searches 4) The first region in which the e-PDCCH is transmitted through one layer and the second region in which the e-PDCCH is transmitted by space-frequency block coding (SFBC)/space-time block coding (STBC)

5) The first region to which beamforming or adaptive beamforming is applied and the second region to which the transmit diversity (TxD) such as SFBC/STBC or non-adaptive beamforming is applied 6) The first region in which CCE/e-CCE is configured or mapped to an RB or a pair of RBs and the second region in which CCE/e-CCE is configured or mapped to multiple RBs by being divided.

7) The first region in which the search space of the e-PDCCH is configured or mapped to the continuous RB or a continuous pair of RBs and the second region in which the search space of the e-PDCCH is configured or mapped to the distributed RB or a distributed pair of RBs By the standards above, the e-PDCCH of a UE may be allocated to the first region and/or the second region.

Also, the region to which multiple e-PDCCHs are allocated may also be physically one or at least two. If the region to which the e-PDCCH is allocated is at least two, the e-PDCCH which is allocated to each region may be configured in the same manner or different manners.

In the description below, it is assumed that the first region and the second region are distinguished according to the standard 1). That is, the first region is a region in which the e-PDCCH of the minimum aggregation level is transmitted from a PRB or a pair of PRBs, and the second region is a region in which the e-PDCCH of the minimum aggregation level is divisionally transmitted from multiple PRBs or multiple pair of PRBs. In other words, the first region is a region in which the e-PDCCHs are allocated in localized manner, and the second region is a region in which the e-PDCCHs are allocated in distributed manner. Also, although it is exemplified that the region in which the e-PDCCHs are allocated in localized manner is a non-interleaving region and the region in which the e-PDCCHs are allocated in distributed manner is an interleaving region, the method for configuring the e-PDCCH according to an embodiment of the present invention is not limited thereto.

Figure 16:
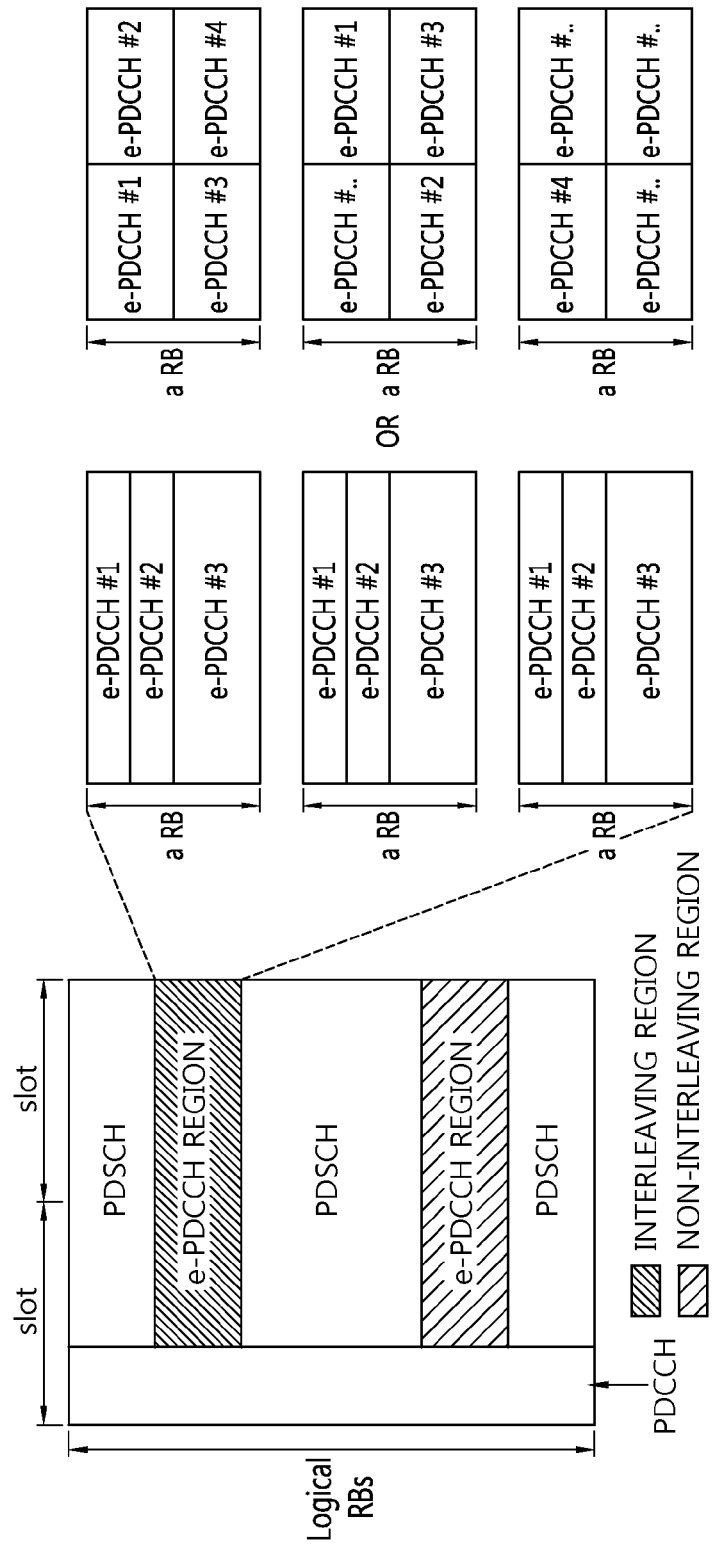
FIG. 16 shows an example of a method for configuring an e-PDCCH according to an embodiment of the present invention.

FIG. 16 shows an example of a method for configuring an e-PDCCH according to an embodiment of the present invention.

Referring to FIG. 16-(a), the e-PDCCH is allocated to the PDSCH region. In this time, the e-PDCCH may be divided and allocated to the interleaving region and the non-interleaving region. If the e-PDCCH is allocated to both of the interleaving region and the non-interleaving region, the interleaving region and the non-interleaving region should not be coexisted but separately allocated.

The interleaving region represents a region to which each e-PDCCH is dispersedly allocated. That is, although the interleaving region itself is configured near to the frequency domain, each e-PDCCH is dispersedly allocated in the interleaving region. The interleaving region represents an example of a region to which the e-PDCCH is dispersedly allocated. Each e-PDCCH may be made up of a plurality of units, and each unit may have a smaller size than the RB's. An RB may include more than one unit of multiple e-PDCCH, or the e-PDCCH and the PDSCH may be included all together. For example, multiple e-PDCCHs may be allocated with being jointly encoded. In this time, the number of RE which is occupied by the e-PDCCH port may be small for the UE to decode the e-PDCCH using only the e-PDCCH port included in the e-PDCCH which is allocated to the UE itself. Also, the overhead may be large for the base station to perform individually signaling the e-PDCCH port to each of unit which is configuring the e-PDCCH. Also, since it is unable to set up the e-PDCCH for each UE to the frequency region which is preferred by each UE, it is also hard to set up a beamforming vector to obtain UE-specific beamforming gain. Accordingly, the e-PDCCH port and/or the value of the procoding vector which is used in the overall e-PDCCH region may be pre-fixed by one or more, or may notify to the UEs through the RRC signaling, etc. The UEs which is able to detect the e-PDCCH port and/or the value of the precoding vector used in the e-PDCCH region may estimate a channel by using the e-PDCCH port which is allocated to the e-PDCCH region even though there is no e-PDCCH which is allocated to itself. If precoding is not performed, it is not necessary to detect the value of the precoding vector.

The non-interleaving region represents a region to which each e-PDCCH is allocated in localized manner without being dispersed. The non-interleaving region represents an example of a region to which the e-PDCCH is allocated in localized manner. Each e-PDCCH is not mixed one another but has its own region, and is able to be decoded in its e-PDCCH port.

FIG. 16-(b) represents an example in which multiple e-PDCCHs are configured in the interleaving region. It is assumed that the basic unit which allocates the e-PDCCH within an RB is maximum 4 along the frequency axis in FIG. 16-(b). The first e-PDCCH for the first UE, the second e-PDCCH for the second UE and the third e-PDCCH for the third UE are allocated to an RB, and each e-PDCCH is dispersedly allocated to each RB according to interleaving. Also, a specific e-PDCCH may be continuously assigned to a plurality of basic units. In FIG. 16-(b), two basic units are assigned to the third e-PDCCH for the third UE.

FIG. 16-(c) shows another example in which multiple e-PDCCHs are configured in the interleaving region. It is assumed that the basic unit which allocates the e-PDCCH within an RB is maximum 4 along the time axis and the frequency axis in FIG. 16-(c). The first e-PDCCH for the first UE, the second e-PDCCH for the second UE, the third e-PDCCH for the third UE and the fourth e-PDCCH for the fourth UE are allocated to an RB, and each e-PDCCH is dispersedly allocated to each RB according to interleaving. In FIG. 16-(c), two basic units are assigned to the third e-PDCCH for the third UE. The location of the e-PDCCH which is allocated to each RB may change according to the RB.

Figure 17:
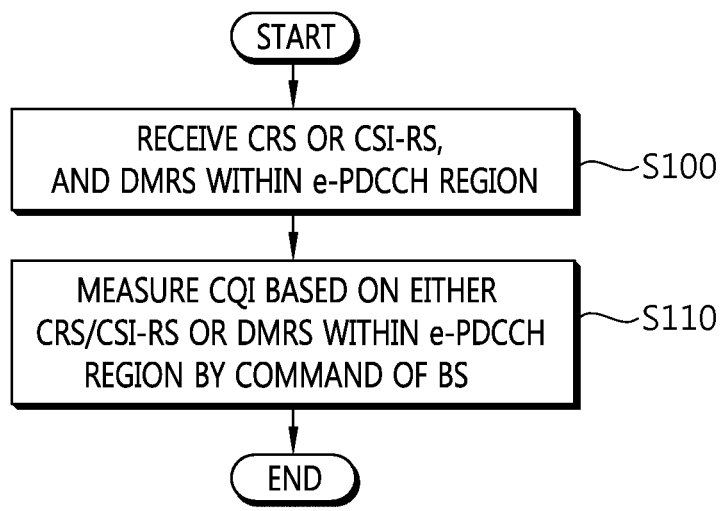
FIG. 17 is an example of a method for measuring a CQI according to an embodiment of the present invention.

FIG. 17 is an example of a method for measuring a CQI according to an embodiment of the present invention.

In step S100, the UE receives a CRS or a CSI RS and a DMRS in the e-PDCCH region. In step S110, the UE measures the CQI based on either the CRS/CSI RS or the DMRS in the e-PDCCH region according to a command of a base station.

According to an embodiment of the present invention, the UE may employ two methods to measure the CQI. One method measures the CQI either by using a channel (H) estimated based on resource elements used by the CRS or the CSI RS or by using HW for which a preferred precoding vector W has been applied, as in the existing method. The other method measures the CQI by using the DMRS in the e-PDCCH region if the e-PDCCH region is configured. The UE, knowing DMRS port information in the e-PDCCH region, may measure the CQI by using the DMRS in the e-PDCCH.

Depending on a situation, the UE may measure the CQI by selecting either of the two methods. For example, if a channel of a specific frequency band is estimated, since the number of resource elements used by the CSI RS is small, the CQI may be measured more accurately by using the DMRS in the e-PDCCH region. On the other hand, even if the DMRS exists in the e-PDCCH region, either of the two methods may be chosen to measure the CQI. For example, a UE receiving the e-PDCCH in a first region employs adaptive beamforming as in a transmission mode 9. Therefore, measurement based on the CSI RS may be more appropriate. Since the relationship between the CSI RS and the DMRS in the second region is not clearly defined, it may be more preferable for a UE receiving the e-PDCCH in a second region to measure the CQI directly by using the DMRS in the e-PDCCH region.

The base station can explicitly or implicitly command the UE to adopt the two methods for measuring the CQI. The base station can command the UE to adopt a CQI measurement method through higher-layer signaling such as an RRC message. The command may be transmitted through a separate message or may be transmitted being included in a different message such as an e-PDCCH configuration message or CQI report message. Although the e-PDCCH configuration message has not been defined yet, it is necessary to define the e-PDCCH configuration message to inform the position at which the e-PDCCH is allocated or an e-PDCCH port in use. Also, if the CQI measurement method is indicated explicitly to the UE, an interference measurement area may be indicated along with or separately from the CQI measurement method.

The base station may implicitly command the UE to adopt the CQI measurement method. At this time, the UE, based on a specific rule, may choose either of a first and a second method for measuring the CQI. For example, a UE having information such as an e-PDCCH port for the e-PDCCH region in which the second method is available may measure the CQI by using the second method, but those UEs not having the information may measure the CQI by using the first method. Similarly, in a subframe including the e-PDCCH region in which the second method is available, the second method may be used to measure the CQI whereas the first method may be used to measure the CQI for the other subframes. Or, in a subframe which does not have the CRS or the CSI RS, the second method may be used to measure the CQI whereas the first method may be used to measure the CQI for the other subframes. The e-PDCCH region in which the second method is available may be interpreted in various ways. For example, if random beamforming is applied for the entire frequency band and the e-PDCCH comprising the second region is distributed uniformly across the entire frequency band and represents the CQI of the entire frequency band, the e-PDCCH region in this case may correspond to the e-PDCCH region in which the second method is available.

Meanwhile, a UE capable of reading the e-PDCCH only in a first region has to measure the CQI by using the first method. A UE, the e-PDCCH of which is included in the first region, may measure the CQI by using the first method, while a UE, the e-PDCCH of which is included in the second region, may measure the CQI by using the second method. The base station may calculate precoding preferred by the UE based on the first method, makes the UE provide the calculated precoding as feedback, and apply the feedback information to the PDSCH. If common precoding is applied to the entire frequency band, the base station may calculate HW based on the second method, make the UE provide the calculated HW as feedback, and apply the feedback information to the PDSCH. A UE which needs to find the e-PDCCH in the first region may measure the CQI by using the first method, while a UE which needs to find the e-PDCCH in the second region may measure the CQI by using the second method. A UE which needs to find the e-PDCCH in both of the first and the second region may measure the CQI by using the first method. The UE may measure the CQI according to either of the first and the second CQI measurement method according to a configured transmission mode.

Figure 18:
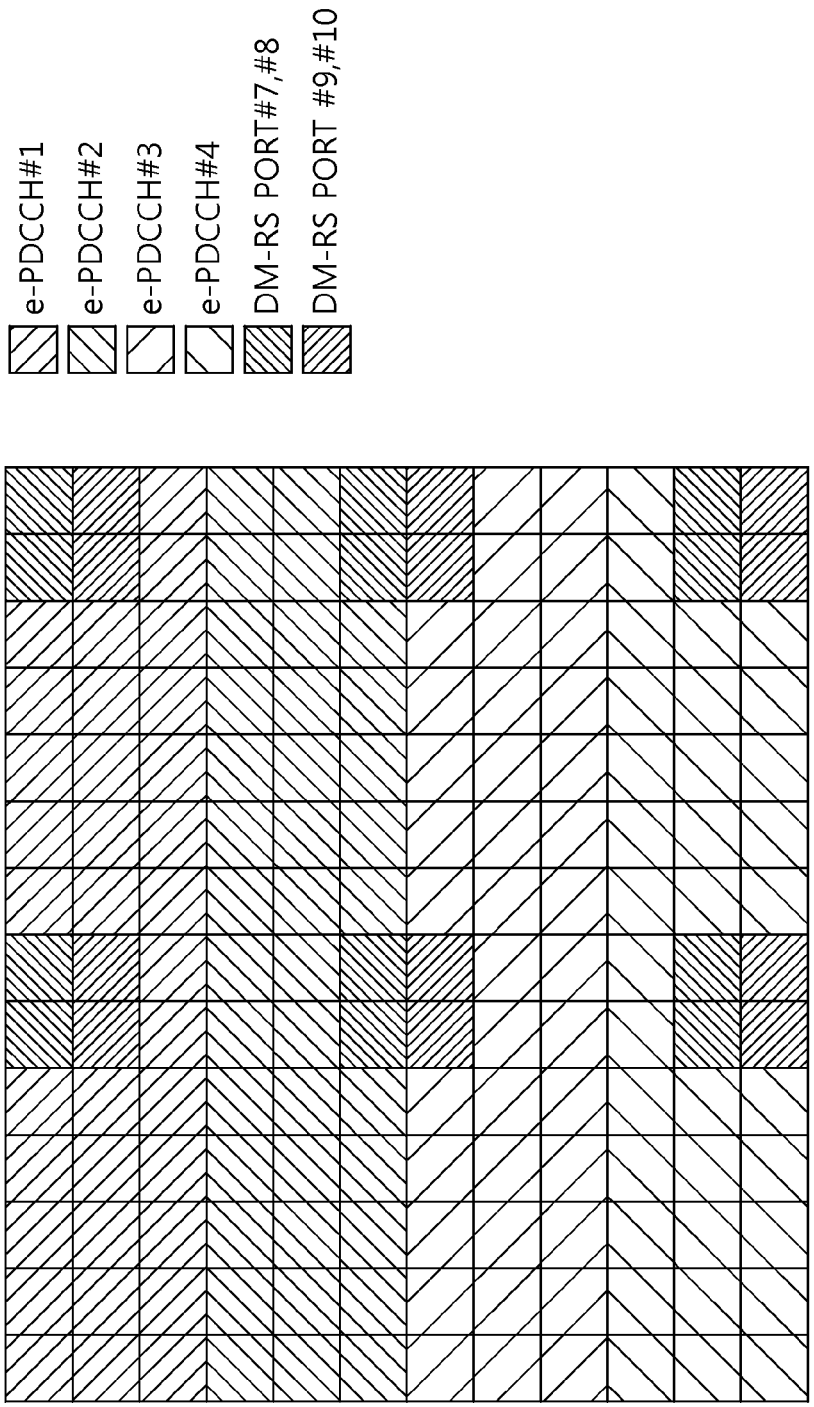
FIG. 18 is an example of an RB according to an embodiment of the present invention.

FIG. 18 is an example of an RB according to an embodiment of the present invention.

FIG. 18 shows one RB when the e-PDCCH is configured as in FIG. 16-(b). It is assumed that four basic units, each of which allocating the e-PDCCH, are assigned within one RB along the frequency axis. It is also assumed that each unit is mapped to e-PDCCH #1, #2, #3, and #4 in order, and is decoded respectively by using e-PDCCH port #7, #8, #9, and #10. The position of resource elements used by the DMRS in the e-PDCCH region is the same as shown in FIG. 11. It should be noted that the CRS and the CSI RS have been omitted in FIG. 18 for the sake of convenience.

If the UE performs CQI measurement in a subframe including the e-PDCCH region, and the e-PDCCH port in the e-PDCCH region and the precoding vector are known while a control signal is not received through the e-PDCCH, the DMRS may be used to measure the CQI in the e-PDCCH region. The e-PDCCH port in the e-PDCCH region or the precoding vector may be pre-determined or signaled to the UE. For example, the RBs belonging to the e-PDDCH region may be predetermined to be decoded by using the e-PDCCH port #7, #8, #9, and #10 for each unit, and may be informed to the UE through RRC signaling. If the DMRS in the e-PDCCH region is precoded, a preceding vector may also be pre-determined or informed to the UE through RRC signaling. The UE may measure the CQI by using all of the four e-PDCCH ports or by using one or more arbitrary e-PDCCH ports among the four e-PDCCH ports. If the same precoding vector is used in the e-PDCCH region, only one e-PDCCH port may be used to measure the CQI. The one e-PDCCH port may be predetermined or informed to the UE through RRC signaling.

Figure 19:
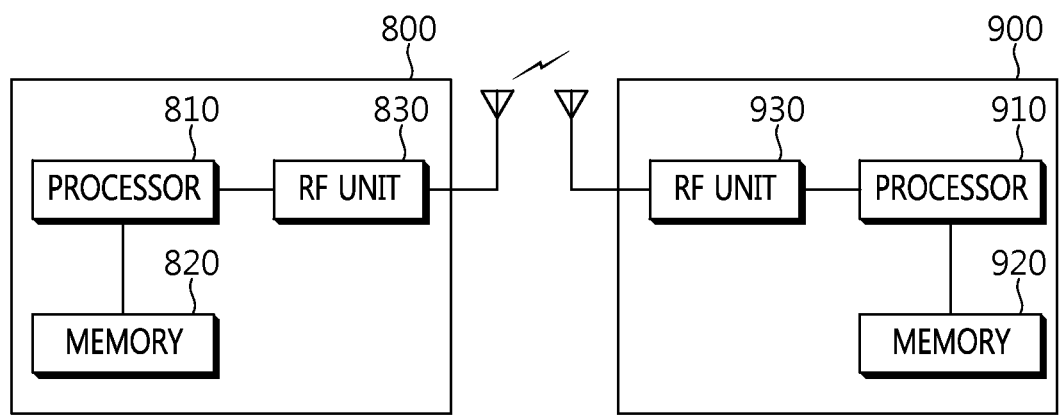
FIG. 19 is a block diagram showing wireless communication system to implement an embodiment of the present invention.

FIG. 19 is a block diagram showing wireless communication system to implement an embodiment of the present invention.

A BS 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 includes a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for measuring, by a user equipment (UE), a channel quality indicator (CQI) in a wireless communication system, the method comprising:
  receiving, from a base station, at least one of a cell-specific reference signal (CRS) and a channel state information reference signal (CSI RS) transmitted in a cell-specific manner;
  receiving, from the base station, a demodulation reference signal (DMRS) transmitted in a UE-specific manner in an enhanced physical downlink control channel (e-PDCCH) region configured within a physical downlink shared channel (PDSCH) region;
  receiving, from the base station, a command for a measurement of the CQI;
  if the command for the measurement of the CQI indicates whether the UE measures the CQI based on at least one of the CRS or the CSI RS or based on the DMRS, measuring the CQI based on either at least one of the CRS and the CSI RS or the DMRS according to the command for the measurement of the CQI; and
  if the command for the measurement of the CQI does not indicate whether the UE measures the CQI based on at least one of the CRS or the CSI RS or based on the DMRS:
    measuring the CQI based on the DMRS if the UE has e-PDCCH port information for the e-PDCCH region; and
    measuring the CQI based on at least one of the CRS and the CSI RS if the UE doesn't have the e-PDCCH port information for the e-PDCCH region,
  wherein the e-PDCCH port information is antenna port information used by the DMRS.

2. The method of claim 1, wherein the command of the base station is received through higher layer signaling.

3. The method of claim 1, wherein the e-PDCCH port information is predetermined or received from the base station.

4. The method of claim 1, further comprising:
  if the command for the measurement of the CQI does not indicate whether the UE measures the CQI based on at least one of the CRS or the CSI RS or based on the DMRS, measuring the CQI based on the DMRS if the UE has the e-PDCCH port information for the e-PDCCH region and a precoding vector.

5. The method of claim 4, wherein the precoding vector is predetermined or received from the base station.

6. The method of claim 1, wherein the number of the e-PDCCH port is one or more.

7. The method of claim 1, wherein the e-PDCCH region is configured in a distributed region within the PDSCH region.

8. The method of claim 7, wherein the distributed region is a region in which an e-PDCCH of one UE is allocated in a distributed manner.

9. The method of claim 7, wherein the distributed region is a region in which an e-PDCCH of a minimum aggregation level is transmitted being distributed from a plurality of physical resource blocks (PRBs) or PRB pairs.

10. The method of claim 7, wherein the distributed region uses all of given N e-PDCCH antenna ports.

11. The method of claim 7, wherein the distributed region is a region in which control channel elements (CCEs) or enhanced CCEs (e-CCEs) are configured or mapped by being divided in a plurality of RBs.

12. The method of claim 7, wherein the distributed region is a region in which a search space of the e-PDCCH is configured or mapped in a distributed RB or RB pair.

13. A user equipment (UE) for measuring a channel quality indicator (CQI) in a wireless communication system, the UE comprising:
  a radio frequency (RF) unit for transmitting or receiving a radio signal; and
  a processor connected to the RF unit, and configured to:
    receive, from a base station, at least one of a cell-specific reference signal (CRS) and a channel state information reference signal (CSI RS) transmitted in a cell-specific manner;
    receive, from the base station, a demodulation reference signal (DMRS) transmitted in a UE-specific manner in an enhanced physical downlink control channel (e-PDCCH) region configured within a physical downlink shared channel (PDSCH) region;
    receive, from the base station, a command for a measurement of the CQI,
    if the command for the measurement of the CQI indicates whether the UE measures the CQI based on at least one of the CRS or the CSI RS or based on the DMRS, measure the CQI based on either at least one of the CRS and the CSI RS or the DMRS according to the command for the measurement of the CQI; and
    if the command for the measurement of the CQI does not indicate whether the UE measures the CQI based on at least one of the CRS or the CSI RS or based on the DMRS:
      measure the CQI based on the DMRS if the UE has e-PDCCH port information for the e-PDCCH region; and
      measure the CQI based on at least one of the CRS and the CSI RS if the UE doesn't have the e-PDCCH port information for the e-PDCCH region,
  wherein the e-PDCCH port information is antenna port information used by the DMRS.

* * * * *